(12) United States Patent
Burkhardt et al.

(10) Patent No.: US 10,686,220 B2
(45) Date of Patent: Jun. 16, 2020

(54) NONAQUEOUS ELECTROLYTE COMPOSITIONS

(71) Applicant: Solvay SA, Brussels (BE)

(72) Inventors: Stephen E. Burkhardt, Wilmington, DE (US); Xudong Chen, Hockessin, DE (US); Charles J. Dubois, Orange, TX (US); William L. Holstein, Hockessin, DE (US); Kostantinos Kourtakis, Media, PA (US); Mark Gerrit Roelofs, Earleville, MD (US)

(73) Assignee: Solvay SA, Brussels (BE)

( * ) Notice: Subject to any disclaimer, the term of this patent is extended or adjusted under 35 U.S.C. 154(b) by 506 days.

(21) Appl. No.: 14/244,968

(22) Filed: Apr. 4, 2014

(65) Prior Publication Data

US 2014/0302401 A1    Oct. 9, 2014

Related U.S. Application Data

(60) Provisional application No. 61/952,967, filed on Mar. 14, 2014, provisional application No. 61/919,160, (Continued)

(51) Int. Cl.
*H01M 10/0567* (2010.01)
*H01M 4/525* (2010.01)
(Continued)

(52) U.S. Cl.
CPC ....... *H01M 10/0567* (2013.01); *H01M 4/505* (2013.01); *H01M 4/525* (2013.01); *H01M 10/0525* (2013.01); *H01M 10/0569* (2013.01); *H01M 4/485* (2013.01); *H01M 4/587* (2013.01); *H01M 2300/004* (2013.01); *H01M 2300/0034* (2013.01); *H01M 2300/0037* (2013.01)

(58) Field of Classification Search
CPC ......... H01M 10/0567; H01M 10/0569; H01M 10/0568; H01M 2300/0025
See application file for complete search history.

(56) References Cited

U.S. PATENT DOCUMENTS 2,824,141 A    2/1958  Zisman et al.
3,006,964 A   10/1961  Oesterling
(Continued)

FOREIGN PATENT DOCUMENTS

CN    101617432 A    12/2009
CN    102263292 A    11/2011
(Continued)

OTHER PUBLICATIONS

US 8,372,547 B2, 02/2013, Koh et al. (withdrawn)
(Continued)

*Primary Examiner* — Sadie White
(74) *Attorney, Agent, or Firm* — Osha Liang LLP

(57) ABSTRACT

Electrolyte compositions comprising fluorinated acyclic carboxylic acid esters, fluorinated acyclic carbonates, and/or fluorinated acyclic ethers; co-solvents; and certain film-forming chemical compounds are described. The electrolyte compositions are useful in electrochemical cells, such as lithium ion batteries where they provide the improved performance of a combination of high capacity and high cycle life.

24 Claims, 7 Drawing Sheets

Related U.S. Application Data filed on Dec. 20, 2013, provisional application No. 61/885,585, filed on Oct. 2, 2013, provisional application No. 61/808,335, filed on Apr. 4, 2013.

(51) Int. Cl.
  *H01M 4/505* (2010.01)
  *H01M 10/0525* (2010.01)
  *H01M 10/0569* (2010.01)
  *H01M 4/485* (2010.01)
  *H01M 4/587* (2010.01)

(56) References Cited

U.S. PATENT DOCUMENTS

| | | |
|---|---|---|
| 5,273,840 A | 12/1993 | Dominey |
| 5,352,548 A | 10/1994 | Fujimoto et al. |
| 5,446,134 A | 8/1995 | Armand et al. |
| 5,534,634 A | 7/1996 | Appel et al. |
| 5,561,232 A | 10/1996 | Hao et al. |
| 5,659,062 A | 8/1997 | Yokoyama et al. |
| 5,738,957 A | 4/1998 | Amine et al. |
| 5,847,156 A | 12/1998 | Eldin et al. |
| 5,847,188 A | 12/1998 | Yokoyama et al. |
| 5,925,283 A | 7/1999 | Taniuchi et al. |
| 5,962,166 A | 10/1999 | Ein-Eli et al. |
| 6,168,878 B1 | 1/2001 | Fauteux et al. |
| 6,337,158 B1 | 1/2002 | Nakajima et al. |
| 6,420,069 B2 | 7/2002 | Amine et al. |
| 6,465,135 B1 | 10/2002 | Nishimura et al. |
| 6,495,293 B1 | 12/2002 | Arai et al. |
| 6,506,516 B1 | 1/2003 | Wietelmann et al. |
| 6,506,524 B1 | 1/2003 | McMillan et al. |
| 6,534,220 B2 | 3/2003 | Garbe |
| 6,680,145 B2 | 1/2004 | Obrovac et al. |
| 6,723,473 B1 | 4/2004 | Oura et al. |
| 6,878,492 B2 | 4/2005 | Takeuchi et al. |
| 6,958,198 B2 | 10/2005 | Iwamoto et al. |
| 6,964,828 B2 | 11/2005 | Lu et al. |
| 7,026,070 B2 | 4/2006 | Noguchi et al. |
| 7,078,128 B2 | 7/2006 | Lu et al. |
| 7,229,718 B2 | 6/2007 | Yamaguchi et al. |
| 7,303,840 B2 | 12/2007 | Thackeray et al. |
| 7,312,001 B2 | 12/2007 | Kim et al. |
| 7,381,496 B2 | 6/2008 | Onnerud et al. |
| 7,416,813 B2 | 8/2008 | Fujihara et al. |
| 7,468,223 B2 | 12/2008 | Thackeray et al. |
| 7,491,471 B2 | 2/2009 | Yamaguchi et al. |
| 7,541,114 B2 | 6/2009 | Ohzuku et al. |
| 7,635,536 B2 | 12/2009 | Johnson et al. |
| 7,718,319 B2 | 5/2010 | Manthiram et al. |
| 7,754,389 B2 | 7/2010 | Yamaguchi et al. |
| 7,790,308 B2 | 7/2010 | Johnson et al. |
| 7,981,544 B2 | 7/2011 | Morishima |
| 8,092,942 B1 | 1/2012 | Chen et al. |
| 8,097,368 B2 | 1/2012 | Chiga et al. |
| 8,158,285 B2 | 4/2012 | Im et al. |
| 8,178,246 B2 | 5/2012 | Shima |
| 8,216,726 B2 | 7/2012 | Wakita et al. |
| 8,277,973 B2 | 10/2012 | Kawashima |
| 8,288,039 B2 | 10/2012 | Im et al. |
| 8,367,254 B2 | 2/2013 | Im et al. |
| 8,372,549 B2 | 2/2013 | Im et al. |
| 8,389,160 B2 | 3/2013 | Venkatachalam et al. |
| 8,394,534 B2 | 3/2013 | Lopez et al. |
| 8,415,056 B2 | 4/2013 | Koh et al. |
| 8,435,680 B2 | 5/2013 | Park et al. |
| 8,455,143 B2 | 6/2013 | Lee et al. |
| 8,535,832 B2 | 7/2013 | Kandasamy et al. |
| 8,518,525 B2 | 8/2013 | Dennes et al. |
| 8,530,099 B2 | 9/2013 | Chen et al. |
| 8,546,024 B2 | 10/2013 | Jeon et al. |
| 8,557,447 B2 | 10/2013 | Lee |
| 8,586,245 B2 | 11/2013 | Yamaguchi et al. |
| 8,668,838 B2 | 3/2014 | Takahashi et al. |
| 8,673,506 B2 | 5/2014 | Jeon et al. |
| 8,715,852 B2 | 5/2014 | Kim et al. |
| 8,715,865 B2 | 5/2014 | Xu et al. |
| 8,735,005 B2 | 5/2014 | Holstein et al. |
| 8,795,903 B2 | 8/2014 | Smart et al. |
| 8,871,384 B2 | 10/2014 | Koh et al. |
| 8,877,389 B2 | 11/2014 | Koh et al. |
| 8,945,781 B2 | 2/2015 | Chiga et al. |
| 8,946,452 B2 | 2/2015 | Dietz et al. |
| 9,093,718 B2 | 7/2015 | Dietz et al. |
| 9,105,943 B2 | 8/2015 | Jeon et al. |
| 9,246,191 B2 | 1/2016 | Jeon et al. |
| 2003/0180618 A1 | 9/2003 | Inoue et al. |
| 2003/0190529 A1 | 10/2003 | Kim et al. |
| 2004/0157133 A1 | 8/2004 | Kim et al. |
| 2005/0196670 A1 | 9/2005 | Yamaguchi et al. |
| 2006/0051671 A1 | 3/2006 | Thackeray et al. |
| 2006/0115739 A1 | 6/2006 | Yamaguchi et al. |
| 2006/0147808 A1 | 7/2006 | Xiao et al. |
| 2006/0154149 A1 | 7/2006 | Arai et al. |
| 2006/0216612 A1 | 9/2006 | Jambunathan et al. |
| 2007/0042267 A1 | 2/2007 | Kim et al. |
| 2007/0148540 A1 | 6/2007 | Chiga et al. |
| 2007/0178379 A1 | 8/2007 | Tamura et al. |
| 2007/0190412 A1 | 8/2007 | Chiga et al. |
| 2007/0224504 A1 | 9/2007 | Kita et al. |
| 2007/0287071 A1 | 12/2007 | Chiga et al. |
| 2008/0102375 A1 | 5/2008 | Shima |
| 2008/0131772 A1 | 5/2008 | Jambunathan et al. |
| 2008/0145763 A1 | 6/2008 | Koh et al. |
| 2008/0292971 A1 | 11/2008 | Iharu et al. |
| 2009/0142663 A1 | 6/2009 | Takeuchi et al. |
| 2009/0253044 A1 | 10/2009 | Nogi et al. |
| 2009/0253048 A1* | 10/2009 | Shima ............... C07C 69/96 |
| | | 429/338 |
| 2010/0035162 A1* | 2/2010 | Chiga ............... H01M 10/052 |
| | | 429/343 |
| 2010/0047695 A1 | 2/2010 | Smart et al. |
| 2010/0062344 A1 | 3/2010 | Koh et al. |
| 2010/0081062 A1 | 4/2010 | Chiga et al. |
| 2010/0108934 A1 | 5/2010 | Flynn et al. |
| 2010/0119956 A1 | 5/2010 | Tokuda et al. |
| 2010/0183926 A1 | 7/2010 | Kim et al. |
| 2010/0190055 A1 | 7/2010 | Khakhalev |
| 2010/0266904 A1 | 10/2010 | Jeon et al. |
| 2010/0266905 A1 | 10/2010 | Jeon et al. |
| 2010/0273064 A1* | 10/2010 | Jeon ............... H01M 4/621 |
| | | 429/326 |
| 2011/0008684 A1 | 1/2011 | Jeon et al. |
| 2011/0111305 A1 | 5/2011 | Jeon et al. |
| 2011/0111307 A1 | 5/2011 | Koh et al. |
| 2011/0123872 A1 | 5/2011 | Koh et al. |
| 2011/0143217 A1 | 6/2011 | Arora et al. |
| 2011/0171539 A1 | 7/2011 | Patoux et al. |
| 2011/0195317 A1 | 8/2011 | Koh et al. |
| 2011/0256458 A1 | 10/2011 | Tani |
| 2011/0311866 A1 | 12/2011 | Lim et al. |
| 2012/0009485 A1 | 1/2012 | Xu |
| 2012/0136175 A1 | 5/2012 | Fuseya et al. |
| 2012/0141869 A1 | 6/2012 | Takahata |
| 2012/0149852 A1 | 6/2012 | Dennes et al. |
| 2012/0164519 A1 | 6/2012 | Lee et al. |
| 2012/0164542 A1* | 6/2012 | Iwaya ............... H01G 9/038 |
| | | 429/326 |
| 2012/0196190 A1 | 8/2012 | Jeon et al. |
| 2012/0208093 A1 | 8/2012 | Ihara et al. |
| 2012/0219866 A1 | 8/2012 | Onuki et al. |
| 2012/0301795 A1 | 11/2012 | Kaneko et al. |
| 2012/0321965 A1 | 12/2012 | Fujikawa et al. |
| 2012/0328938 A1 | 12/2012 | Geiculescu et al. |
| 2013/0029230 A1 | 1/2013 | Park et al. |
| 2013/0029231 A1 | 1/2013 | Jeon et al. |
| 2013/0149602 A1 | 6/2013 | Luski et al. |
| 2013/0189591 A1 | 7/2013 | Nishimura et al. |
| 2013/0309564 A1 | 11/2013 | Yoshida et al. |
| 2013/0330612 A1* | 12/2013 | Choi ............... C01G 45/1228 |
| | | 429/211 |
| 2013/0337342 A1 | 12/2013 | Hallac et al. |
| 2014/0017559 A1 | 1/2014 | Kawasaki et al. |

(56) References Cited

U.S. PATENT DOCUMENTS

| | | |
|---|---|---|
| 2014/0017572 A1 | 1/2014 | Uehara et al. |
| 2014/0045002 A1 | 2/2014 | Yokoyama et al. |
| 2014/0045034 A1 | 2/2014 | Kondo et al. |
| 2014/0045049 A1 | 2/2014 | Iyori et al. |
| 2014/0045050 A1 | 2/2014 | Hattori et al. |
| 2014/0045051 A1 | 2/2014 | Hattori et al. |
| 2014/0045057 A1 | 2/2014 | Tode et al. |
| 2014/0045077 A1 | 2/2014 | Minami et al. |
| 2014/0079990 A1 | 3/2014 | Yanagida et al. |
| 2014/0094527 A1* | 4/2014 | Lavoine-Hanneguelle .......... A23L 1/2215 514/784 |
| 2014/0120415 A1 | 5/2014 | Suguro et al. |
| 2014/0141313 A1* | 5/2014 | Takase ................. H01M 2/1686 429/144 |
| 2014/0141323 A1 | 5/2014 | Saruwatari et al. |
| 2014/0178772 A1 | 6/2014 | Jeong et al. |
| 2014/0227584 A1 | 8/2014 | Holstein et al. |
| 2014/0234701 A1 | 8/2014 | Tanaka et al. |
| 2014/0243561 A1 | 8/2014 | Mueller et al. |
| 2014/0248529 A1* | 9/2014 | Chen ................. C01G 53/54 429/163 |
| 2014/0302401 A1 | 10/2014 | Burkhardt et al. |
| 2014/0302402 A1 | 10/2014 | Chen et al. |
| 2014/0308578 A1 | 10/2014 | Onizuka et al. |
| 2014/0322579 A1 | 10/2014 | Mitsuhashi et al. |
| 2014/0322616 A1 | 10/2014 | Onizuka et al. |
| 2014/0329141 A1 | 11/2014 | Onizuka et al. |
| 2015/0049642 A1 | 2/2015 | Eng et al. |
| 2015/0086862 A1 | 3/2015 | Osada et al. |
| 2015/0111112 A1 | 4/2015 | Petrov et al. |
| 2015/0140444 A1 | 5/2015 | Dubois et al. |
| 2015/0171467 A1 | 6/2015 | Dubois et al. |
| 2015/0303521 A1 | 10/2015 | Sasaki et al. |
| 2016/0049691 A1 | 2/2016 | Suzuki et al. |
| 2016/0087307 A1 | 3/2016 | Burkhardt et al. |

FOREIGN PATENT DOCUMENTS

| | | |
|---|---|---|
| CN | 102569888 A | 7/2012 |
| CN | 102751533 A | 10/2012 |
| CN | 102790236 A | 11/2012 |
| CN | 102983358 A | 3/2013 |
| CN | 103117414 A | 5/2013 |
| CN | 103165939 A | 6/2013 |
| CN | 103682440 A | 3/2014 |
| CN | 103730688 A | 4/2014 |
| CN | 103943884 A | 7/2014 |
| CN | 103972588 A | 8/2014 |
| EP | 0924788 A1 | 6/1999 |
| EP | 1890357 A1 | 2/2008 |
| EP | 2037029 A1 | 3/2009 |
| EP | 2365573 A3 | 9/2011 |
| EP | 2378602 2 A | 10/2011 |
| EP | 2477268 A1 | 7/2012 |
| EP | 2012132976 A1 | 10/2012 |
| EP | 2535975 A1 | 12/2012 |
| EP | 2571089 A1 | 3/2013 |
| EP | 2626943 A1 | 8/2013 |
| EP | 2339684 B1 | 9/2013 |
| JP | 62290072 A | 12/1987 |
| JP | 620719 A | 11/1994 |
| JP | 8298134 A | 11/1996 |
| JP | H9-199168 A | 7/1997 |
| JP | 10116627 A | 6/1998 |
| JP | 1186901 A | 3/1999 |
| JP | 2000188128 A | 7/2000 |
| JP | 2001345120 A | 12/2001 |
| JP | 2002124263 A | 4/2002 |
| JP | 3311611 B2 | 8/2002 |
| JP | 2003100342 A | 4/2003 |
| JP | 3444607 A | 9/2003 |
| JP | 2003282138 A | 10/2003 |
| JP | 2004047131 A | 2/2004 |
| JP | 2004281185 A | 7/2004 |
| JP | 2004241339 A | 8/2004 |
| JP | 2005078820 A | 3/2005 |
| JP | 2005293920 A | 10/2005 |
| JP | 2006032300 A | 2/2006 |
| JP | 2006140115 A | 6/2006 |
| JP | 2006172721 A | 6/2006 |
| JP | 2006172950 A | 6/2006 |
| JP | 2006331866 A | 7/2006 |
| JP | 2006210022 A | 8/2006 |
| JP | 2008123714 A | 5/2008 |
| JP | 2008159419 A | 7/2008 |
| JP | 2008288144 A | 11/2008 |
| JP | 2009123465 A | 6/2009 |
| JP | 4328915 A | 9/2009 |
| JP | 2011049153 A | 3/2011 |
| JP | 2011082033 A | 4/2011 |
| JP | 2012094491 B2 | 5/2012 |
| JP | 5201364 B2 | 6/2013 |
| JP | 5321063 B2 | 6/2013 |
| JP | 5235437 B2 | 7/2013 |
| JP | 2015005443 A | 1/2014 |
| JP | 2011071098 A | 4/2014 |
| KR | 100908570 B1 | 8/2005 |
| KR | 20130134237 A | 12/2013 |
| KR | 20140083170 A | 7/2014 |
| KR | 20140106355 B1 | 9/2015 |
| KR | 20150106557 A | 9/2015 |
| KR | 101561646 B1 | 10/2015 |
| WO | 9744842 A | 11/1997 |
| WO | 2008079670 A1 | 7/2008 |
| WO | 2008153309 A1 | 12/2008 |
| WO | 2009022848 A1 | 2/2009 |
| WO | 2009035222 A1 | 3/2009 |
| WO | 2009038358 A1 | 3/2009 |
| WO | 2009040367 A2 | 4/2009 |
| WO | 2009084928 A1 | 7/2009 |
| WO | 2011/030832 A1 | 3/2011 |
| WO | 2011051275 A1 | 5/2011 |
| WO | 2011099580 A1 | 8/2011 |
| WO | 2012046514 A1 | 4/2012 |
| WO | 2012132059 A1 | 10/2012 |
| WO | 2012132060 A1 | 10/2012 |
| WO | 2012132976 A1 | 10/2012 |
| WO | WO 2012144785 A2 * | 10/2012 ......... C01G 45/1228 |
| WO | 2012005945 A1 | 12/2012 |
| WO | 2012170240 A1 | 12/2012 |
| WO | 2012176873 A1 | 12/2012 |
| WO | 2013010985 A1 | 1/2013 |
| WO | 2013033579 A1 | 3/2013 |
| WO | 2013033595 A1 | 3/2013 |
| WO | WO-2013033595 A1 * | 3/2013 ............ C01G 53/54 |
| WO | 2013137351 A1 | 9/2013 |
| WO | 2013180781 A1 | 12/2013 |
| WO | 2013180782 A1 | 12/2013 |
| WO | 2013180783 A1 | 12/2013 |
| WO | 2013184881 A1 | 12/2013 |
| WO | 2014080871 A1 | 5/2014 |
| WO | 2014165748 A1 | 10/2014 |
| WO | 2015046174 A1 | 4/2015 |
| WO | 2015051131 A1 | 4/2015 |
| WO | 2015051141 A1 | 4/2015 |
| WO | 2015121731 A1 | 8/2015 |
| WO | 2015179205 A1 | 11/2015 |
| WO | 2015179210 A1 | 11/2015 |
| WO | 2016025589 A1 | 2/2016 |
| WO | 2016044088 A1 | 3/2016 |

OTHER PUBLICATIONS

Fluoroethylene Carbonate Spec Sheet—evidentiary reference.*
2,2-difluoroethyl Acetate Spec Sheet—evidentiary reference.*
Ethylene carbonate Specification Sheet (Year: 2019).*
1,1,2,2-tetrafluoroethyl 2,2,3,3-tetrafluoropropyl ether Specification Sheet (Year: 2019).*
Bessler et al., "Boron Complexes with Dicarboxylic Acids", Zeitschrift fuer Naturforschung, Teil B: Anorganische chemie, Organische

(56) References Cited

OTHER PUBLICATIONS

Chemie, vol. 37B, Issue 8, pp. 1020-1025, Journal, 1982, CODEN: ZNBAD2, issn: 0340-5087. See also English abstract.
Henne, A.L, "A New Fluorination Method", J Am. Chem. Soc., 60(7), 1938, 1569-1571.
Hine, J. et al., "Methylenes as Intermediates in Polar Reactions. XXI. A Sulfur-containing Methylene", J. Amer. Chem. Soc. 82, 6118, 1960.
Jeong, S.-K., et al, "Surface Film Formation on a Graphite Negative Electrode in Lithium-Ion Batteries: Atomic Force Microscopy Study on the Effects of Film-Forming Additives in Propylene Carbonate Solutions", Langmuir, 2001, 17, 8281-8286.
Jung, H.M., et al., "Fluoropropane Sultone as an SEI-forming Additive that Outperforms Vinylene Carbonate", J. Mater. Chem. A, 2013, 1, 11975.
Kudryavtsev, I.Y., et al, "Catalytic Phosphorylation of Polyfluoroalkanols", Izvestiya Akademii Nausk SSSR, Seriya Khimicheskaya, 1982, 11, 2535-2540. Translation.
Lee, H. et al., "SEI Layer-Forming Additives for LiNi0.5Mn1.5O4/ Graphite 5V Li-ion Batteries", Electrochem. Comm. 9 (2007) 801-806.
McMillan, R. et al., "Fluoroethylene Carbonate Electrolyte and Its Use in Lithium Ion Batteries with Graphite Anodes", J Power Sources 81-82 (1999) 20-26.
Mogi, Ryo et al, "Effects of Some Organic Additives on Lithium Deposition in Propylene Carbonate", J. Electrochem. Soc., 2002, 149(12), A1578-A1583.
Nagasubramanian, G. "Fluoro-Carbonate Solvents for Li-Ion Cells", Proc. Electrochem. Soc., 2000, 99(25), 434-439.
Nakajima, T. et al., "Effect of Fluoroesters on the Low Temperature Electrochemical Characteristics of Graphite Electrode", J Fluorine Chem 87 (1998) 221-227.
Rajeshwaran G. G., et al, "Lewis Acid-Mediated Michaelis-Arbuzov Reaction at Room Temperature: A Facile Preparation of Arylmethyl/Heteroarylmethyl Phosphonates", Org. Lett., 2011, 13, 1270-1273.
Sasaki, Y. et al, "Physical and Electrolytic Properties of Partially Fluorinated Organic Solvents and Its Application to Secondary Lithium Batteries: Partially Fluorinated Dialkoxyethanes", ECS Transactions, 16, (35), 2009, 23-31.
Schmitz, R.W. et al, "Investigations on Novel Electrolytes, Solvents and SEI Additives for Use in Lithium-ion Batteries: Systematic Electrochemical Characterization and Detailed Analysis by Spectroscopic Methods", Progress Solid State Chem., 42 (2014) 65-84.
Sekiya, A. et al, "The Potential of Hydrofluoroethers to Replace CFCs, HCFCs, and PFCs", J Fluorine Chem, 101 (2000) 215-221.
SynQuest Laboratories, Inc. Research Chemicals Catalog, 2003, pp. 128-129.
Tarrant, P. et al, "Some Reactions of Fluoroethanes with Sodium Ethoxide", J. Am. Chem. Soc., 75, (1953), 932-934.
Von Cresce, A. et al, "Electrolyte Additive in Support of 5 V Li Ion Chemistry", J Electrochem. Soc., 158 (3), A337-A342 (2011).
Wachtler, M. et al., "The Behaviour of Graphite, Carbon Black, and Li4Ti5O12 in LiBOB-Based Electrolytes", J. Applied Electrochemistry (2006) 36: 1199-1206.
Xu et al, "Sulfone-Based Electrolytes for Lithium-Ion Batteries", Journal of the electrochemical Society, 2002, A920-A926, 149 (7).
Xu, K. "Nonaqueous Liquid Electrolytes for Lithium-Based Rechargeable Batteries", Chem. Rev., 2004, 104, 4303-4418.
Yamaki, J.-I. et al, "Thermal Studies of Fluorinated Ester as a Novel Candidate for Electrolyte Solvent of Lithium Metal Anode Rechargeable Cells", J Power Sources, 102 (2001) 288-293.
Yang, L. et al., "Effect of Impurities and Moisture on Lithium Bisoxalatoborate (LiBOB) Electrolyte Performance in Lithium-Ion Cells", J. Power Sources 195 (2010) 1698-1705.
Yoon, S. et al, Sb-Mox-C (M=Al, Ti, or Mo) Nanocomposite Anodes for Lithium-Ion Batteries, Chem. Mater. 2009, 21, 3898-3904.
Zaharov et al., (Izvestiya Akademii Nausk USSR, Seriya Khimicheskaya, No. 8, p. 1860, 1969, Translation.
Zhang, S.S., "A Review on Electrolyte Additives for Lithium-Ion Batteries", J Power Sources, 162 (2006) 1379-1394.
Zhong, G. B. et al, "Effects of Al Substitution for Ni and Mn on the Electrochemical Properties of LiNi0.5Mn1.5O4", Electrochimica Acta, 56(18), 2011, 6554-6561.
International Search Report and Written Opinion, Related PCT International Application PCT/US2012/053439 dated Jan. 22, 2013.
International Search Report and Written Opinion, Related PCT International Application PCT/US2013/029815 dated Jun. 6, 2013.
International Search Report and Written Opinion, Related PCT International Application PCT/US2013/029818 dated May 14, 2013.
International Search Reportand Written Opinion, Related PCT International Application PCT/US2013/029825 dated May 14, 2013.
International Search Report and Written Opinion, Related PCT International Application PCT/US2012/053415 dated Jan. 22, 2013.
International Search Report and Written Opinion, Related PCT International Application PCT/US2014/058845 dated Dec. 11, 2014.
International Search Report and Written Opinion, Related PCT International Application PCT/US2014/058859 dated Feb. 25, 2015.
International Search Report and Written Opinion, Related PCT International Application PCT/US2015/030785 dated Jul. 16, 2015.
International Search Report and Written Opinion, Related PCT International Application PCT/US2015/030807 dated Jul. 17, 2015.
International Search Report and Written Opinion, Related PCT International Application PCT/US2015/044844 dated Dec. 22, 2015.
International Search Report and Written Opinion, Related PCT International Application PCT/US2015/049642 dated Dec. 22, 2015.
Liu, J. et al., "Understanding the Improved Electrochemical Performances of Fe-Substituted 5 V Spinel Cathode LiMn1.5Ni0.5O4", J. Phys. Chem. C, 2009, 113, 15073-15079.
Smart, M.C. et al., "Li-Ion Electrolytes Containing Ester Co-Solvents for Wide Operating Temperature Range", ECS Transactions, 11(29), 2008, 99-108.
Smith, K.A. et al., "Electrolytes Containing Fluorinated Ester Co-Solvents for Low-Temperature Li-Ion Cells", ECS Transactions, 11(29), 2008, 91-98.
International Search Report, Corresponding PCT International Application PCT/US2014/032961 dated July 15, 2014.
Related Application, U.S. Appl. No. 14/244,984 (Xudong Chen et al.) filed Apr. 4, 2014.
Machine Translation, JP Application No. JP-2006-172721 (NEC Corporation), Filed June 29, 2006.
Machine Translation, JP Application No. JP-2006-172950 (NEC Corporation), Filed June 29, 2006.
Machine Translation, JP Application No. JP-2003-282138 (Mitsubishi Chem Corporation), Filed Oct. 3, 2003.
Office Action issued in U.S. Appl. No. 14/244,984, dated Jul. 11, 2018 (17 pages).
Office Action issued in Japan Application No. 2016-506641, dated May 8, 2018 (9 pages).

\* cited by examiner

NONAQUEOUS ELECTROLYTE COMPOSITIONS

CROSS REFERENCE TO RELATED APPLICATIONS

This application claims the benefit of priority of U.S. Provisional Application Nos. 61/808,335, filed on Apr. 4, 2013; 61/885,585, filed on Oct. 2, 2013; 61/919,160, filed on Dec. 20, 2013, and 61/952,967, filed on Mar. 14, 2014.

TECHNICAL FIELD

The disclosure herein relates to electrolyte compositions containing a fluorinated solvent, a co-solvent, and certain film-forming chemical compounds, which are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethylcarbonate; and a cyclic carbonate, such as ethylene carbonate. However, at cathode potentials above 4.4 V these electrolyte solvents can decompose, which can result in a loss of battery performance. Additionally, there are safety concerns with the use of these electrolyte solvents because of their low boiling point and high flammability.

Various approaches have been investigated to overcome the limitations of commonly used non-aqueous electrolyte solvents. For example, additives, such as cyclic carboxylic acid anhydrides, have been used in combination with the currently used electrolyte solvents (see, for example, Jeon et al. U.S. Patent Application Publication No. 2010/0273064 A1). Additionally, various fluorinated carboxylic acid ester electrolyte solvents have been investigated for use in lithium ion batteries (see, for example, Nakamura et al in JP 4/328,915-B2, JP 3/444,607-B2, and U.S. Pat. No. 8,097,368). Although these electrolyte solvents can be used in lithium ion batteries having high potential cathodes, such as the 4 V spinel $LiMn_2O_4$ cathode, cycling performance can be limited, particularly at high temperatures.

Despite the efforts in the art as described above, a need remains for electrolyte solvents, and compositions thereof, that will have improved cycling performance at high temperature when used in a lithium ion battery, particularly such a battery that operates with a high potential cathode (i.e. up to about 5 V).

SUMMARY

In one embodiment, there is provided herein an electrolyte composition comprising:
a) at least one fluorinated solvent selected from the group consisting of:
  (i) a fluorinated acyclic carboxylic acid ester represented by the formula:

$R^1$—COO—$R^2$, (ii) a fluorinated acyclic carbonate represented by the formula:

$R^3$—OCOO—$R^4$, and (iii) a fluorinated acyclic ether represented by the formula:

$R^5$—O—$R^6$, wherein $R^1$, $R^2$, $R^3$, $R^4$, $R^5$, and $R^6$, independently represent a linear or branched alkyl group; the sum of carbon atoms in any of $R^1$ and $R^2$, $R^3$ and $R^4$, and $R^5$ and $R^6$ is 2 to 7; at least two hydrogens in $R^1$ and/or $R^2$, $R^3$ and/or $R^4$, and $R^5$ and/or $R^6$ are replaced by fluorines; and neither $R^1$, $R^2$, $R^3$, $R^4$, $R^5$, nor $R^6$ contains a $FCH_2$ or FCH group;
b) at least one co-solvent selected from the group consisting of ethylene carbonate, fluoroethylene carbonate, and propylene carbonate;
c) at least one film-forming chemical compound which is present in the electrolyte composition at a concentration at which the film-forming chemical compound decomposes at a potential of less than +1.0 V versus a $Li/Li^+$ reference electrode, such that the electrolyte composition forms a film; and
d) at least one electrolyte salt; with the proviso that b) and c) are different.

In another embodiment the electrolyte composition does not form a film at a potential above 1.0V or above versus a $Li/Li^+$ reference electrode.

In another embodiment there is a provided a method to prepare an electrolyte composition comprising combining a), b), c), and d) as defined above, to form an electrolyte composition.

In another embodiment, there is provided herein an electrolyte composition comprising:
a) at least one fluorinated solvent selected from the group consisting of:
  (i) a fluorinated acyclic carboxylic acid ester represented by the formula:

$R^1$—COO—$R^2$, (ii) a fluorinated acyclic carbonate represented by the formula:

$R^3$—OCOO—$R^4$, and (iii) a fluorinated acyclic ether represented by the formula:

$R^5$—O—$R^6$, wherein $R^1$, $R^2$, $R^3$, $R^4$, $R^5$, and $R^6$, independently represent an a linear or branched alkyl group; the sum of carbon atoms in any of $R^1$ and $R^2$, $R^3$ and $R^4$, and $R^5$ and $R^6$ is 2 to 7; at least two hydrogens in R' and/or $R^2$, $R^3$ and/or $R^4$, and $R^5$ and/or $R^6$ are replaced by fluorines; and neither $R^1$, $R^2$, $R^3$, $R^4$, $R^5$, nor $R^6$ contains a $FCH_2$ or FCH group;
b) at least one co-solvent selected from the group consisting of ethylene carbonate, fluoroethylene carbonate, and propylene carbonate;
c) at least one cyclic carboxylic acid anhydride selected from the group consisting of

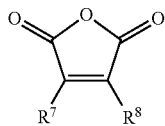

I

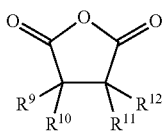

II

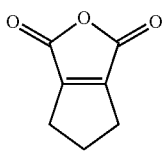

III

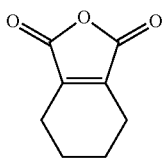

IV

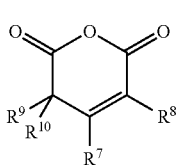

V

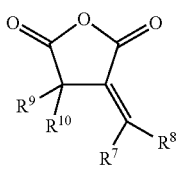

VI

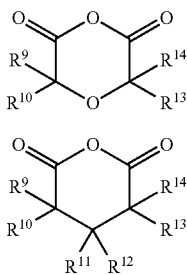

VII

VIII where $R^7$ to $R^{14}$ are independently H, F, C1 to C10 alkyl optionally substituted with one or more of fluorine, alkoxy, or thioalkyl, $O_2$ to C10 alkene, or C6 to C10 aryl; and d) at least one electrolyte salt.

In another embodiment there is a provided a method to prepare an electrolyte composition comprising combining a), b), c), and d) as defined above, to form an electrolyte composition.

In another embodiment, there is provided herein an electrochemical cell comprising a electrolyte composition disclosed herein.

In a further embodiment, the electrochemical cell is a lithium ion battery.

DETAILED DESCRIPTION

Figure 1:
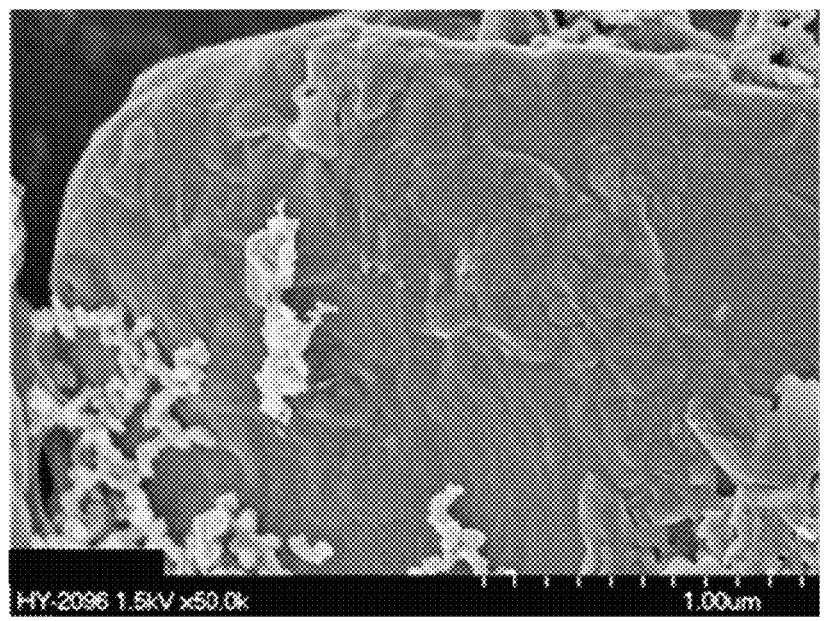
FIG. 1 is a scanning electron micrograph of an untreated graphite electrode, as described in Example 48 herein.

As used above and throughout the disclosure, the following terms, unless otherwise indicated, shall be defined as follows:

The term "electrolyte composition" as used herein, refers to a chemical composition suitable for use as an electrolyte in an electrochemical cell.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

The term "film formation", as used herein, refers to substantially complete coverage of a graphite electrode so that no exposed graphite surface is detected by scanning electron microscopy at a resolution of 20 nm when an electrochemical cell containing the graphite electrode and an electrolyte composition is cycled to a potential of less than +1.0 V versus a Li/Li$^+$ reference electrode, as described in the Examples herein. Substantially complete coverage means that at least about 90%, or at least about 95%, or at least about 98%, or at least about 99%, or at least about 99.9%, or at least about 99.98% of the graphite electrode surface is covered by a film.

Equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li$^+$ reference electrode is assigned here the value of 0.0V. Potential of an anode or cathode means the potential difference between the anode or cathode and that of a Li/Li$^+$ reference electrode. Herein voltage means the voltage difference between the cathode and the anode of a cell, neither electrode of which may be operating at a potential of 0.0V.

Disclosed herein are electrolyte compositions comprising at least one fluorinated solvent, at least one co-solvent, and at least one film-forming chemical compound. The electrolyte compositions are useful in electrochemical cells, particularly lithium ion batteries. Specifically, the electrolyte compositions disclosed herein comprise at least one fluorinated solvent selected from fluorinated acyclic carboxylic acid esters, fluorinated acyclic carbonates, and fluorinated acyclic ethers; at least one co-solvent selected from ethylene carbonate (also referred to herein as EC), fluoroethylene carbonate (also referred to herein as FEC or 4-fluoro-1,3-dioxolan-2-one, CAS No. 114435-02-8), and propylene carbonate; at least one film-forming chemical compound as disclosed herein; and at least one electrolyte salt.

Suitable fluorinated acyclic carboxylic acid esters are represented by the formula $R^1$—COO—$R^2$, where $R^1$ and $R^2$ independently represent a linear or branched alkyl group, the sum of carbon atoms in $R^1$ and $R^2$ is 2 to 7, at least two hydrogens in $R^1$ and/or $R^2$ are replaced by fluorines (that is, at least two hydrogens in $R^1$ are replaced by fluorines, or at least two hydrogens in $R^2$ are replaced by fluorines, or at least two hydrogens in $R^1$ and at least two hydrogens in $R^2$ are replaced by fluorines), and neither $R^1$ nor $R^2$ contains a $FCH_2$ or FCH group. The presence of a monofluoroalkyl group (i.e. $FCH_2$ or FCH) in the carboxylic acid ester may cause toxicity. Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), and $HCF_2$—$CH_2$—$CH_2$—COO—$CH_2CH_3$ (ethyl 4,4-difluorobutanoate, CAS No. 1240725-43-2). In one embodiment, the fluorinated acyclic carboxylic acid ester is 2,2-difluoroethyl acetate ($CH_3$—COO—$CH_2CF_2H$).

In one embodiment, the number of carbon atoms in $R^1$ in the formula above is 1, 3, 4, or 5.

In another embodiment, the number of carbon atoms in $R^1$ in the formula above is 1.

In another embodiment, $R^1$ and $R^3$ in the formula above do not contain fluorine, and $R^2$ and $R^4$ contain fluorine.

Suitable fluorinated acyclic carbonates are represented by the formula $R^3$—OCOO—$R^4$, where $R^3$ and $R^4$ independently represent a linear or branched alkyl group, the sum of carbon atoms in $R^3$ and $R^4$ is 2 to 7, at least two hydrogens in $R^3$ and/or $R^4$ are replaced by fluorines (that is, at least two hydrogens in $R^3$ are replaced by fluorines, or at least two hydrogens in $R^4$ are replaced by fluorines, or at least two hydrogens in $R^3$ and at least two hydrogens in $R^4$ are replaced by fluorines), and neither $R^3$ nor $R^4$ contains a $FCH_2$ or FCH group. Examples of suitable fluorinated acyclic carbonates include without limitation $CH_3$—OC(O)O—$CH_2CF_2H$ (methyl 2,2-difluoroethyl carbonate, CAS No. 916678-13-2), $CH_3$—OC(O)O—$CH_2CF_3$ (methyl 2,2,2-trifluoroethyl carbonate, CAS No. 156783-95-8), $CH_3$—OC(O)O—$CH_2CF_2CF_2H$ (methyl 2,2,3,3-tetrafluoropropyl carbonate, CAS No. 156783-98-1), $HCF_2CH_2$—OCOO—$CH_2CH_3$ (ethyl 2,2-difluoroethyl carbonate, CAS No. 916678-14-3), and $CF_3CH_2$—OCOO—$CH_2CH_3$ (ethyl 2,2,2-trifluoroethyl carbonate, CAS No. 156783-96-9).

Suitable fluorinated acyclic ethers are represented by the formula: $R^5$—O—$R^6$, where $R^5$ and $R^6$ independently represent a linear or branched alkyl group, the sum of carbon atoms in $R^5$ and $R^6$ is 2 to 7, at least two hydrogens in $R^5$ and/or $R^6$ (that is, at least two hydrogens in $R^5$ are replaced by fluorines, or at least two hydrogens in $R^6$ are replaced by fluorines, or at least hydrogens in $R^5$ are replaced by fluorines and at least two hydrogens in $R^6$ are replaced by fluorines), are replaced by fluorines and neither $R^5$ nor $R^6$ contains a $FCH_2$ or FCH group. Examples of suitable fluorinated acyclic ethers include without limitation $HCF_2CF_2CH_2$-β-$CF_2CF_2H$ (CAS No. 16627-68-2) and $HCF_2CH_2$—O—$CF_2CF_2H$ (CAS No. 50807-77-7).

A mixture of two or more of these fluorinated acyclic carboxylic acid ester, fluorinated acyclic carbonate, and/or fluorinated acyclic ether solvents may also be used. A non-limiting example is a mixture of 2,2-difluoroethyl acetate and 2,2-difluoroethyl propionate or a mixture of 2,2-difluoroethyl acetate and 2,2 difluoroethyl methyl carbonate.

In the electrolyte compositions disclosed herein, the fluorinated solvent or mixtures thereof can be used in various amounts depending on the desired properties of the electrolyte composition. In one embodiment, the fluorinated solvent comprises about 5% to about 95% by weight of the electrolyte composition. In another embodiment, the fluorinated solvent comprises about 10% to about 80% by weight of the electrolyte composition. In another embodiment, the fluorinated solvent comprises about 30% to about 70% by weight of the electrolyte composition. In another embodiment, the fluorinated solvent comprises about 50% to about 70% by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition. In another embodiment, the fluorinated solvent comprises about 60% to about 65% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—O—$CF_2CF_2H$. Alternatively, some of these fluorinated solvents may be purchased from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. These fluorinated solvents may be purified using distillation methods such as vacuum distillation or spinning band distillation.

The electrolyte compositions disclosed herein also comprise at least one co-solvent selected from ethylene carbonate, fluoroethylene carbonate, and propylene carbonate. Mixtures of two or more of these co-solvents may also be used. In one embodiment, the co-solvent is ethylene carbonate. In another embodiment, the co-solvent is fluoroethylene carbonate. It is desirable to use a co-solvent that is battery grade or has a purity level of at least about 99.9%, and more particularly at least about 99.99%. These co-solvents are available commercially from companies such as Novolyte, (Independence, Ohio).

The electrolyte compositions disclosed herein can also comprise at least one additional co-solvent such as, without limitation, ethyl methyl carbonate, dimethyl carbonate, diethyl carbonate, butylene carbonate, and ethyl methyl sulfone.

In the electrolyte compositions disclosed herein, the co-solvent or mixtures thereof can be used in various amounts depending on the desired properties of the electrolyte composition. In one embodiment, the co-solvent comprises greater than 10% to about 80% by weight of the electrolyte composition. In another embodiment, the co-solvent comprises greater than 10% to about 60% by weight of the electrolyte composition. In another embodiment, the co-solvent comprises greater than 10% to about 50% by weight of the electrolyte composition. In another embodiment, the co-solvent comprises about 10% to about 40% by weight of the electrolyte composition or about 20% to about 40% by weight of the electrolyte composition. In another embodiment, the co-solvent comprises about 20% to about 30% by weight of the electrolyte composition. In another embodiment, the co-solvent comprises about 26% by weight of the electrolyte composition.

In one embodiment, the electrolyte composition comprises at least one fluorinated acyclic carboxylic acid ester and ethylene carbonate. In another embodiment, the electrolyte composition comprises 2,2-difluoroethyl acetate and ethylene carbonate. In another embodiment, the electrolyte composition comprises 2,2-difluoroethyl acetate and fluoroethylene carbonate.

The electrolyte compositions disclosed herein further comprise at least one film-forming chemical compound, which is present in the electrolyte composition at a concentration at which the film-forming chemical compound decomposes at a potential of less than +F1.0 V versus a Li/Li$^+$ reference electrode. As used herein, the term "decomposes" means that the film-forming chemical compound is chemically transformed in the recited potential range to a chemical form that participates in the formation of a film on the anode of an electrochemical cell, such as a lithium ion battery. The film-forming chemical compound, when decomposed, may react with other components of the electrolyte composition, such as the co-solvent and/or fluorinated solvent to form the film, or the other components such as the co-solvent and/or fluorinated solvent, when decomposed, may react with the film-forming compound to form the film. Although the co-solvent may also decompose at a potential of less than +F1.0 V in certain concentration ranges, for purposes of the invention the co-solvent and the film-forming chemical compound are different, that is, are not the same chemical compound. The potential range in which the film-forming chemical compound decomposes depends on its chemical structure and its concentration. For example, fluoroethylene carbonate and maleic anhydride decompose to participate in film formation at a potential of less than +F1.0 V versus a Li/Li$^+$ reference electrode. One skilled in the art can readily determine the concentration at which the film-forming compound forms a film on the anode in the recited potential range using scanning electron microscopy, as described in the Examples herein. While not wishing to be bound by any theory, it is hypothesized that the film prevents the anode from having an additional sustained reaction with the electrolyte components under battery evaluation conditions.

In another embodiment, the electrolyte composition does not form a film at 1.0 V or above versus a Li/Li$^+$ reference electrode.

Suitable examples of film-forming chemical compounds, include without limitation, fluoroethylene carbonate, ethylene carbonate, lithium bis(oxalate)borate, and cyclic carboxylic acid anhydrides. Some chemical compounds, such as fluoroethylene carbonate and ethylene carbonate, can serve as a co-solvent or a film-forming chemical compound, depending on the concentration at which they are used. The concentration ranges for the co-solvents are given above. The film-forming chemical compound or a mixture thereof, is generally present in the electrolyte composition in an amount of about 0.01% to about 10%, more particularly, about 0.05% to about 10%, more particularly about 0.1% to about 10%, more particularly about 0.1% to about 5.0%, more particularly about 0.25% to about 5.0%, and more particularly about 0.25% to about 3.0% by weight of the total electrolyte composition. In one embodiment, the electrolyte is present in the electrolyte composition at about 0.25% to about 5.0% by weight.

In some embodiments, the film-forming chemical compound is a cyclic carboxylic acid anhydride. Suitable cyclic carboxylic acid anhydrides are represented by the following formulae:

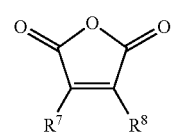

I

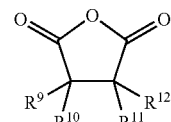

II

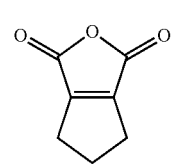

III

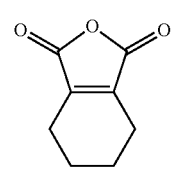

IV

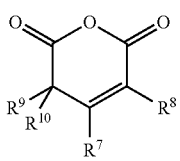

V

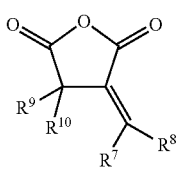

VI

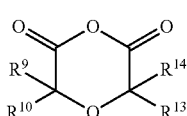

VII

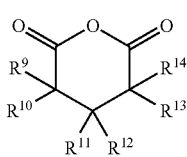

VIII where $R^7$ to $R^{14}$ are independently H, F, C1 to C10 linear or branched alkyl optionally substituted with one or more of fluorine, alkoxy, or thioalkyl, C2 to C10 alkene, or C6 to C10 aryl. Examples of suitable cyclic carboxylic acid anhydrides include without limitation of maleic anhydride, succinic anhydride, glutaric anhydride, 2,3-dimethylmaleic anhydride, citraconic anhydride, 1-cyclopentene-1,2-dicarboxylic anhydride, 2,3-diphenylmaleic anhydride, 3,4,5,6-tetrahydrophthalic anhydride, 2,3-dihydro-1,4-dithiono-[2,3-c]furan-5,7 dione, and phenylmaleic anhydride. A mixture of two or more of these cyclic carboxylic acid anhydrides may also be used. In one embodiment, the cyclic carboxylic acid anhydride is maleic anhydride. These materials can be obtained from specialty chemical companies such as Sigma-Aldrich, Inc. (Milwaukee, Wis.). It is desirable to purify the cyclic carboxylic acid anhydride to a purity level of at least about 99.0%, more particularly at least about 99.9%. Purification may be done using known methods, as described above.

In one embodiment, the electrolyte composition comprises a fluorinated acyclic carboxylic acid ester, ethylene carbonate, and maleic anhydride. In another embodiment, the electrolyte composition comprises 2,2-difluoroethyl acetate, ethylene carbonate, and maleic anhydride. In some embodiments, the electrolyte composition comprises about 50% to about 80%, or about 70%, or about 60% to about 65% of 2,2-difluoroethyl acetate, about 20% to about 30% of ethylene carbonate, and about 0.25% to about 5.0%, or about 0.25% to about 3.0% of maleic anhydride by weight of the total electrolyte composition.

In another embodiment, the electrolyte composition comprises a fluorinated acyclic carboxylic acid ester, ethylene carbonate and/or fluoroethylene carbonate, and maleic anhydride. By ethylene carbonate and/or fluoroethylene carbonate it is meant ethylene carbonate alone, fluoroethylene carbonate, or a mixture of ethylene carbonate and fluoroethylene carbonate. In another embodiment, the electrolyte composition comprises 2,2-difluoroethyl acetate, ethylene carbonate and/or fluoroethylene carbonate, and maleic anhydride. In another embodiment, the electrolyte composition comprises 2,2-difluoroethyl acetate, fluoroethylene carbonate, and maleic anhydride. In another embodiment the electrolyte composition comprises about 50% to about 80% of 2,2-difluoroethyl acetate, about 10% to about 40%, or about 20% to about 30% combined total of ethylene carbonate and/or fluoroethylene carbonate, and about 0.25% to about 5.0% of maleic anhydride by weight of the total electrolyte composition. In another embodiment, the electrolyte composition comprises about 50% to about 80% of 2,2-difluoroethyl acetate, about 20% to about 30% of ethylene carbonate, about 0.25% to about 5.0%, or about 0.25% to about 3.0% of fluoroethylene carbonate and about 0.25% to about 5.0%, or about 0.25% to about 3.0% of maleic anhydride by weight of the total electrolyte composition.

Disclosed herein are electrolyte compositions comprising:
a) at least one fluorinated solvent selected from the group consisting of:
 (i) a fluorinated acyclic carboxylic acid ester represented by the formula:
 $R^1$—COO—$R^2$,
 (ii) a fluorinated acyclic carbonate represented by the formula:
 $R^3$—OCOO—$R^4$, and
 (iii) a fluorinated acyclic ether represented by the formula:
 $R^5$—O—$R^6$,
 wherein $R^1$, $R^2$, $R^3$, $R^4$, $R^5$, and $R^6$, independently represent an linear or branched alkyl group; the sum of carbon atoms in any of $R^1$ and $R^2$, $R^3$ and $R^4$, and $R^5$ and $R^6$ is 2 to 7; at least two hydrogens in $R^1$ and/or $R^2$, $R^3$ and/or $R^4$, and $R^5$ and/or $R^6$ are replaced by fluorines; and neither $R^1$, $R^2$, $R^3$, $R^4$, $R^5$, nor $R^6$ contains a $FCH_2$ or FCH group;
b) at least one co-solvent selected from the group consisting of ethylene carbonate, fluoroethylene carbonate, and propylene carbonate;
c) at least one cyclic carboxylic acid anhydride selected from the group consisting of

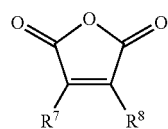

I

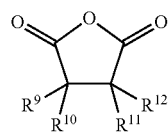

II

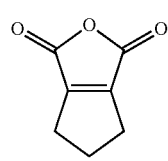

III

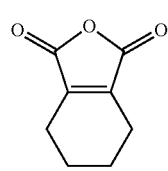

IV

-continued

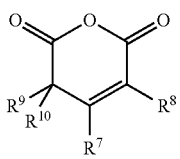

V

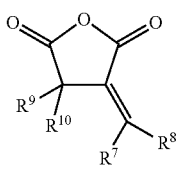

VI

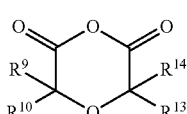

VII

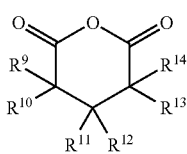

VIII where $R^7$ to $R^{14}$ are independently H, F, C1 to C10 alkyl optionally substituted with one or more of fluorine, alkoxy, or thioalkyl, C2 to C10 alkene, or C6 to C10 aryl; and d) at least one electrolyte salt.

The electrolyte compositions are useful in electrochemical cells, particularly lithium ion batteries. The fluorinated solvent and co-solvent are as described above. Examples of suitable cyclic carboxylic acid anhydrides include without limitation of maleic anhydride, succinic anhydride, glutaric anhydride, 2,3-dimethylmaleic anhydride, citraconic anhydride, 1-cyclopentene-1,2-dicarboxylic anhydride, 2,3-diphenylmaleic anhydride, 3,4,5,6-tetrahydrophthalic anhydride, 2,3-dihydro-1,4-dithiono-[2,3-c]furan-5,7 dione, and phenylmaleic anhydride. A mixture of two or more of these cyclic carboxylic acid anhydrides may also be used. In one embodiment, the cyclic carboxylic acid anhydride is maleic anhydride. These materials can be obtained from specialty chemical companies such as Sigma-Aldrich, Inc. (Milwaukee, Wis.). It is desirable to purify the cyclic carboxylic acid anhydride to a purity level of at least about 99.0%, more particularly at least about 99.9%. Purification may be done using known methods, as described above.

The cyclic carboxylic acid anhydrides, or a mixture thereof, is generally present in the electrolyte composition in an amount of about 0.01% to about 10%, more particularly, about 0.05% to about 10%, more particularly about 0.1% to about 10%, more particularly about 0.1% to about 5.0%, more particularly about 0.25% to about 5.0%, and more particularly about 0.25% to about 3.0% by weight of the total electrolyte composition.

In one embodiment, the electrolyte is present in the electrolyte composition at about 0.25% to about 5.0% by weight.

In one embodiment, the electrolyte composition comprises a fluorinated acyclic carboxylic acid ester, ethylene carbonate, and maleic anhydride. In another embodiment, the electrolyte composition comprises 2,2-difluoroethyl acetate, ethylene carbonate, and maleic anhydride. In some embodiments, the electrolyte composition comprises about 50% to about 80%, or about 70%, or about 60% to about 65% of 2,2-difluoroethyl acetate, about 20% to about 30% of ethylene carbonate, and about 0.25% to about 5.0%, or about 0.25% to about 3.0% of maleic anhydride by weight of the total electrolyte composition.

In another embodiment, the electrolyte composition comprises a fluorinated acyclic carboxylic acid ester, ethylene carbonate and/or fluoroethylene carbonate, and maleic anhydride. By ethylene carbonate and/or fluoroethylene carbonate it is meant ethylene carbonate alone, fluoroethylene carbonate, or a mixture thereof ethylene carbonate and fluoroethylene carbonate. In another embodiment, the electrolyte composition comprises 2,2-difluoroethyl acetate, fluoroethylene carbonate, and maleic anhydride. In another embodiment the electrolyte composition comprises about 50% to about 80% of 2,2-difluoroethyl acetate, about 10% to about 40%, or about 20% to about 40%, or about 20% to about 30% sum total of ethylene carbonate and/or fluoroethylene carbonate, and about 0.25% to about 5.0% of maleic anhydride by weight of the total electrolyte composition. In another embodiment, the electrolyte composition comprises about 50% to about 80% of 2,2-difluoroethyl acetate, about 20% to about 30% of ethylene carbonate, about 0.25% to about 5.0%, or about 0.25% to about 3.0% of fluoroethylene carbonate and about 0.25% to about 5.0%, or about 0.25% to about 3.0% of maleic anhydride by weight of the total electrolyte composition.

In another embodiment, other additives may be present, such as lithium bis(oxalate)borate, lithium difluorooxalatoborate, or other lithium borate salts.

The electrolyte compositions disclosed herein also contain at least one electrolyte salt. Suitable electrolyte salts include without limitation lithium hexafluorophosphate (LiPF$_6$),
lithium tris(pentafluoroethyl)trifluorophosphate (LiPF$_3$(C$_2$F$_5$)$_3$),
lithium bis(trifluoromethanesulfonyl)imide,
lithium bis(perfluoroethanesulfonyl)imide,
lithium (fluorosulfonyl) (nonafluorobutanesulfonyl) imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
Li$_2$B$_{12}$F$_{12-x}$H$_x$ where x is equal to 0 to 8, and
mixtures of lithium fluoride and anion receptors such as B(OC$_6$F$_5$)$_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, and more particularly about 0.5 to about 1.2 M.

Electrolyte compositions disclosed herein can additionally or optionally comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 wt % to about 10 wt %, alternatively from about 0.05 wt % to about 5 wt % of the electrolyte composition, or alternatively from about 0.5 wt % to about 2 wt % of the electrolyte composition.

Suitable gassing additives that are known conventionally are, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-1,2-naphthoquinone; 2-acetylfuran; 2-acetyl-5-methylfuran; 2-methyl imidazole1-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-Difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; ethylene carbonate; diethyl carbonate; dimethyl carbonate; ethyl methyl carbonate; and 1,1'-[oxybis(methylenesulfonyl)]bis-ethene.

In another embodiment, there is provided herein an electrochemical cell comprising a housing, an anode and a cathode disposed in the housing and in ionically conductive contact with one another, an electrolyte composition, as described above, providing an ionically conductive pathway between the anode and the cathode, and a porous or microporous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The pore size of the porous separator is sufficiently large to permit transport of ions, but small enough to prevent contact of the anode and cathode either directly or from particle penetration or dendrites which can from on the anode and cathode.

In another embodiment, the electrochemical cell is a lithium ion battery. Suitable cathode materials for a lithium ion battery include without limitation electroactive compounds comprising lithium and transition metals, such as $LiCoO_2$, $LiNiO_2$, $LiMn_2O_4$, $LiCo_{0.2}Ni_{0.2}O_2$ or $LiV_3O_8$;

$Li_aCoG_bO_2$ ($0.90 \leq a \leq 1.8$, and $0.001 \leq b \leq 0.1$);

$Li_aNi_bMn_cCo_dR_eO_{2-f}Z_f$ where $0.8 \leq a \leq 1.2$, $0.1 \leq b \leq 0.05$, $0.2 \leq c \leq 0.7$, $0.05 \leq d \leq 0.4$, $0 \leq e \leq 0.2$, b+c+d+e is about 1, and $0 \leq f \leq 0.08$;

$Li_aA_{1-b}R_bD_2$ ($0.90 \leq a \leq 1.8$ and $0 \leq b \leq 0.5$);

$Li_aE_{1-b}R_bO_{2-c}D_c$ ($0.90 \leq a \leq 1.8$, $0 \leq b \leq 0.5$ and $0 \leq c \leq 0.05$);

$Li_aNi_{1-b-c}CO_bR_cO_{2-d}Z_d$ where $0.9 \leq a \leq 1.8$, $0 \leq b \leq 0.4$, $0 \leq c \leq 0.05$, and $0 \leq d \leq 0.05$;

$Li_{1+z}Ni_{1-x-y}Co_xAl_yO_2$ where $0 < x < 0.3$, $0 < y < 0.1$, and $0 < z < 0.06$;

$LiNi_{0.5}Mn_{1.5}O_4$; $LiFePO_4$, $LiMnPO_4$, $LiCoPO_4$, and $LiVPO_4F$.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof, R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166, 6,680,145, 6,964,828, 7,026,070, 7,078,128, 7,303,840, 7,381,496, 7,468,223, 7,541,114, 7,718,319, 7,981,544, 8,389,160, 8,394,534, and 8,535,832, and the references therein. By "rare earth element" is meant the lanthanide elements from La to Lu, and Y and Sc.

In another embodiment, the cathode in the lithium ion battery disclosed herein comprises a cathode active material exhibiting greater than 30 mAh/g capacity in the potential range greater than 4.6 V versus a Li/Li+ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode in the lithium ion battery disclosed herein comprises a cathode active material which is charged to a potential greater than or equal to about 4.35 V, or greater than 4.5 V, or greater than 4.6 V versus a Li/Li+ reference electrode. Other examples are layered-layered high-capacity oxygen-release cathodes such as those described in U.S. Pat. No. 7,468,223 charged to upper charging potentials above 4.5 V.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH.H_2O$ at about 800 to about 950° C. in oxygen for 3 to 24 hours, as described in detail in the Examples herein. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein further contains an anode, which comprises an anode active material that is capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; nanocomposites containing antimony or tin, for example nanocopmposites containing antimony, oxides of aluminum, titanium, or molybdenum, and carbon, such as those described by Yoon et al (*Chem. Mater.* 21, 3898-3904, 2009); and lithium titanates such as $Li_4Ti_5O_{12}$ and $LiTi_2O_4$. In one embodiment, the anode active material is lithium titanate or graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi NEI Inc. (Somerset, N.J.), and Farasis Energy Inc. (Hayward, Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. application Ser. No. 12/963,927 (filed 9 Dec. 2010, U.S. Patent Application Publication No. 2012/0149852).

The housing of the lithium ion battery hereof may be any suitable container to house the lithium ion battery components described above. Such a container may be fabricated in the shape of small or large cylinder, a prismatic case or a pouch.

The lithium ion battery disclosed herein may be used for grid storage or as a power source in various electronically-powered or -assisted devices ("Electronic Device") such as a computer, a camera, a radio or a power tool, various telecommunications devices, or various transportation devices (including a motor vehicle, automobile, truck, bus or airplane).

EXAMPLES

The meaning of abbreviations used is as follows: "g" means gram(s), "mg" means milligram(s), "µg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s), "A" means amperes, "mA" mean milliampere(s), "mAh/g" mean milliamperes hour(s) per gram, "V" means volt(s), "kV" means kilovolt(s), "eV" means electronvolt(s), "keV" means kiloelectronvolts, "xC" refers to a constant current which is the product of x and a current in A which is numerically equal to the nominal capacity of the battery expressed in Ah, "Pa" means pascal(s), "kPa" means kilopascal(s), "rpm" means revolutions per minute, "psi" means pounds per square inch, "NMR" means nuclear magnetic resonance spectroscopy, "GC/MS" means gas chromatography/mass spectrometry.

Materials and Methods

Preparation of 2,2-Difluoroethyl Acetate

The 2,2-difluoroethyl acetate used in the following Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent19091S-433, 30.m, 250 µm, 0.25 µm; carrier gas —He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3 A molecular sieves, until water was not detectable by Karl Fischer titration (i.e., <1 ppm).

Preparation of $LiMn_{1.5}Ni_{0.45}Fe_{0.05}O_4$ Cathode Active Material

The following is a typical procedure used for the preparation of the cathode active material. For the preparation of $LiMn_{1.5}Ni_{0.45}Fe_{0.05}O_4$, 401 g manganese (II) acetate tetrahydrate (Aldrich, Milwaukee Wis., Product No. 63537), 125 g nickel (II) acetate tetrahydrate (Aldrich, Product No. 72225) and 10 g iron (II) acetate anhydrous (Alfa Aesar, Ward Hill, Mass., Product No. 31140) were weighed into bottles on a balance, then dissolved in 5.0 L of deionized water. KOH pellets were dissolved in 10 L of deionized water to produce a 3.0 M solution inside a 30 L reactor. The solution containing the metal acetates was transferred to an addition funnel and dripped into the rapidly stirred reactor to precipitate the mixed hydroxide material. Once all 5.0 L of the metal acetate solution was added to the reactor, stirring was continued for 1 h. Then, stirring was stopped and the precipitate was allowed to settle overnight. After settling, the liquid was removed from the reactor and 15 L of fresh deionized water was added. The contents of the reactor were stirred, allowed to settle again, and the liquid was removed. This rinse process was repeated. Then, the precipitate was transferred to two (split evenly) coarse glass frit filtration funnels covered with Dacron® paper. The solids were rinsed with deionized water until the filtrate pH reached 6.0 (pH of deionized rinse water), and a further 20 L of deionized water was added to each filter cake. Finally, the cakes were dried in a vacuum oven at 120° C. overnight. The yield at this point was typically 80-90%.

The hydroxide precipitate was ground and mixed with lithium carbonate. This step was done in 50 g batches using a Pulverisette automated mortar and pestle (FRITSCH, Germany). For each batch the hydroxide precipitate was weighed, then ground alone for 5 min in the Pulveresette. Then, a stoichiometric amount with small excess of lithium carbonate was added to the system. For 50 g of hydroxide precipitate, 10.5 g of lithium carbonate was added. Grinding was continued for a total of 60 min with stops every 10-15 min to scrape the material off the surfaces of the mortar and pestle with a sharp metal spatula. If humidity caused the material to form clumps, it was sieved through a 40 mesh screen once during grinding, then again following grinding.

The ground material was fired in an air box furnace inside shallow rectangular alumina trays. The trays were 158 mm by 69 mm in size, and each held about 60 g of material. The firing procedure consisted of ramping from room temperature to 900° C. in 15 h, holding at 900° C. for 12 h, then cooling to room temperature in 15 h.

After firing, the powder was ball-milled to reduce particle size. Then, 54 g of powder was mixed with 54 g of isopropyl alcohol and 160 g of 5 mm diameter zirconia beads inside a polyethylene jar. The jar was then rotated on a pair of rollers for 6 h to mill. The slurry was separated by centrifugation, and the powder was dried at 120° C. to remove moisture.

Cathode Preparation

The following is a typical procedure used for the preparation of the cathodes used in the Examples herein. The binder was obtained as a 12% solution of polyvinylidene fluoride in NMP (N-methylpyrrolidone, KFL No. 1120, Kureha America Corp. New York, N.Y.). The following materials were used to make an electrode paste: 4.16 g $LiMn_{1.5}Ni_{0.45}Fe_{0.05}O_4$ cathode active powder as prepared above; 0.52 g carbon black (Denka uncompressed, DENKA Corp., Japan); 4.32 g PVDF (polyvinylidene difluoride) solution; and 7.76 g+1.40 g NMP (Sigma Aldrich). The materials were combined in a ratio of 80:10:10, cathode active powder: PVDF:carbon black, as described below. The final paste contained 28.6% solids.

The carbon black, the first portion of NMP, and the PVDF solution were first combined in a plastic vial and centrifugally mixed (ARE-310, Thinky USA, Inc., Laguna Hills, Calif.) two times, for 60 s at 2000 rpm each time. The cathode active powder and the $2^{nd}$ portion of NMP were added and the paste was centrifugally mixed two times (2×1 min at 2000 rpm). The vial was placed in an ice bath and the rotor-stator shaft of a homogenizer (model PT 10-35 GT, 7.5 mm diameter stator, Kinematicia, Bohemia, N.Y.) was inserted into the vial. The gap between the vial top and the stator was wrapped with aluminum foil to minimize water ingress into the vial. The resulting paste was homogenized for two times for 15 min each at 6500 rpm and then twice more for 15 min at 9500 rpm. Between each of the four homogenization periods, the homogenizer was moved to another position in the paste vial.

The paste was cast using doctor blades with a 0.41-0.51 mm gate height onto aluminum foil (25 µm thick, 1145-0, Allfoils, Brooklyn Heights, Ohio) using an automatic coater (AFA-II, MTI Corp., Richmond, Calif.). The electrodes were dried for 30 min at 95° C. in a mechanical convection oven (model FDL-115, Binder Inc., Great River, N.Y.). The resulting 51-mm wide cathodes were placed between 125 µm thick brass sheets and passed through a calender three times using 100 mm diameter steel rolls at ambient temperature with nip forces increasing in each of the passes, starting at 260 kg with the final pass at 770 kg. Loadings of cathode active material were 9 to 12 mg/cm².

Anode Preparation

The following is a typical procedure used for the preparation of the anodes used in the Examples herein. An anode paste was prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials were combined in a ratio of 88:0.17:7:4.83, graphite:oxalic acid:PVDF:carbon black, as described below. The final paste contained 29.4% solids.

Oxalic acid, carbon black, NMP, and PVDF solution were combined in a plastic vial. The materials were mixed for 60 s at 2000 rpm using a planetary centrifugal mixer. The mixing was repeated a second time. The graphite was then added. The resulting paste was centrifugally mixed two times. The vial was mounted in an ice bath and homogenized twice using a rotor-stator for 15 min each time at 6500 rpm and then twice more for 15 min at 9500 rpm. The point where the stator shaft entered the vial was wrapped with aluminum foil to minimize water vapor ingress to the vial. Between each of the four homogenization periods, the homogenizer was moved to another position in the paste vial. The paste was then centrifugally mixed three times.

The paste was cast using a doctor blade with a 230 μm gate height on to copper foil (CF-LBX-10, Fukuda, Kyoto, Japan) using the automatic coater. The electrodes were dried for 30 min at 95° C. in the mechanical convection oven. The resulting 51-mm wide anodes were placed between 125 μm thick brass sheets and passed through a calender three times using 100 mm diameter steel rolls at ambient temperature with nip forces increasing in each of the passes, starting at 260 kg with the final pass at 770 kg.

Coin Cells

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Nonaqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a polyimide nanofiber (Energain®, E.I. du Pont de Nemours and Company, Wilmington, Del.). The nonaqueous electrolytes used in the preparation of the coin cells are described in the following Examples.

Examples 1-43 and Comparative Examples 1-16

High Temperature Performance of Coin Cells

The coin cells were cycled twice for formation using a commercial battery tester (Series 4000, Maccor, Tulsa, Okla.) at ambient temperature using constant current charging and discharging between potential limits of 3.4-4.9 V at a current of 12 mA per gram of cathode active material, which is approximately a 0.1 C rate. The coin cells were placed in an oven at 55° C. and cycled using constant current charging and discharging between voltage limits of 3.4-4.9 V at a current of 240 mA per gram of cathode active material, which is approximately a 2 C rate.

The results are summarized in Table 1, which provides the solvents and additives used, the coulombic efficiency (CE) measured in the first cycle of formation, CE=(discharge capacity)/(charge capacity), the discharge capacity in the first cycle at 55° C. per gram of cathode active material, the CE in the 10th cycle, and the cycle life at 55° C. The cycle life was measured as the number of cycles required to reduce the discharge capacity to 80% of the capacity measured in the 2nd cycle of cycling at 55° C. N indicates the number of experiments which were averaged for the cycle life data.

In Examples 1 and 2, the electrolyte was a mixture of 26.3 wt % ethylene carbonate (EC, BASF, Independence, Ohio), 61.3 wt % 2,2-difluoroethyl acetate (DFEA), 1.0 wt % maleic anhydride (MA, Sigma Aldrich, Milwaukee, Wis.), and 11.4 wt % LiPF$_6$ (BASF, Independence, Ohio). The electrolyte was prepared by combining DFEA with the EC and MA, and the mixture further dried with 3 A molecular sieves. After removing the sieves, the salt was added.

In Examples 3 and 4, the electrolyte was a mixture of 26.3 wt % ethylene carbonate (EC), 61.3 wt % 2,2-difluoroethyl acetate (DFEA), 1.0 wt % glutaric anhydride (GA, Sigma Aldrich, Milwaukee, Wis.), and 11.4 wt % LiPF$_6$, prepared by a method similar to that of Examples 1 and 2.

In Examples 5-7, the electrolyte was a mixture of 26.3 wt % ethylene carbonate (EC), 61.3 wt % 2,2-difluoroethyl acetate (DFEA), 1.0 wt % 2,3-dimethylmaleic anhydride (DMMA, obtained from Sigma-Aldrich), and 11.4 wt % LiPF$_6$.

In Examples 8-10, the electrolyte was a mixture of 26.3 wt % ethylene carbonate (EC), 61.3 wt % 2,2-difluoroethyl acetate (DFEA), 1.0 wt % citraconic anhydride (MMA, obtained from Sigma-Aldrich), and 11.4 wt % LiPF$_6$.

In Examples 11-13, the electrolyte was a mixture of 26.3 wt % ethylene carbonate (EC), 61.3 wt % 2,2-difluoroethyl acetate (DFEA), 1.0 wt % 1-cyclopentene-1,2-dicarboxylic anhydride (CpMA, obtained from Sigma-Aldrich), and 11.4 wt % LiPF$_6$.

In Examples 14-16, the electrolyte was a mixture of 26.3 wt % ethylene carbonate (EC), 61.3 wt % 2,2-difluoroethyl acetate (DFEA), 1.0 wt % phenylmaleic anhydride (PhMA, obtained from Sigma-Aldrich), and 11.4 wt % LiPF$_6$.

In Example 17, the electrolyte was a mixture of 26.22 wt % ethylene carbonate (EC), 61.62 wt % 2,2-difluoroethyl acetate (DFEA), 0.50% MA, 0.50% FEC, and 11.16 wt % LiPF$_6$.

In Example 18, the electrolyte was a mixture of 26.22 wt % ethylene carbonate (EC), 61.62 wt % 2,2-difluoroethyl acetate (DFEA), 0.25% MA, 0.75% FEC, and 11.16 wt % LiPF$_6$.

In Example 19, the electrolyte was a mixture of 26.22 wt % ethylene carbonate (EC), 61.62 wt % 2,2-difluoroethyl acetate (DFEA), 0.75% MA, 0.25% FEC, and 11.16 wt % LiPF$_6$.

In Example 20, the electrolyte was a mixture of 26.11 wt % ethylene carbonate (EC), 61.62 wt % 2,2-difluoroethyl acetate (DFEA), 1.0% CA (citraconic anhydride, obtained from Aldrich), 1.0% FEC, and 11.16 wt % LiPF$_6$.

In Example 21, the electrolyte was a mixture of 26.11 wt % ethylene carbonate (EC), 61.62 wt % 2,2-difluoroethyl acetate (DFEA), 1.0% IA (itaconic anhydride, obtained from Aldrich), 1.0% FEC, and 11.16 wt % LiPF$_6$.

In Example 22, the electrolyte was a mixture of 26.3 wt % ethylene carbonate (EC), 61.3 wt % 2,2-difluoroethyl acetate (DFEA), 0.1% glutaric anhydride (GA), and 11.4 wt % LiPF$_6$.

In Example 23, the electrolyte was a mixture of 26.3 wt % ethylene carbonate (EC), 61.3 wt % 2,2-difluoroethyl acetate (DFEA), 0.5% GA, and 11.4 wt % LiPF$_6$.

In Example 24, the electrolyte was a mixture of 26.3 wt % ethylene carbonate (EC), 61.3 wt % 2,2-difluoroethyl acetate (DFEA), 1.0% GA, and 11.4 wt % LiPF$_6$.

In Example 25, the electrolyte was a mixture of 26.3 wt % ethylene carbonate (EC), 61.3 wt % 2,2-difluoroethyl acetate (DFEA), 1.0% MA, 0.3% GA, and 11.4 wt % LiPF$_6$.

In Example 26, the electrolyte was a mixture of 26.3 wt % ethylene carbonate (EC), 61.3 wt % 2,2-difluoroethyl acetate (DFEA), 1.0% MA, 0.1% GA, and 11.4 wt % LiPF$_6$.

In Example 27, the electrolyte was a mixture of 26.3 wt % ethylene carbonate (EC), 61.3 wt % 2,2-difluoroethyl acetate (DFEA), 0.3% MA, 0.3% GA, and 11.4 wt % LiPF$_6$.

In Example 28, the electrolyte was a mixture of 26.3 wt % ethylene carbonate (EC), 61.3 wt % 2,2-difluoroethyl acetate (DFEA), 0.3% MA, 0.1% GA, and 11.4 wt % LiPF$_6$.

In Example 29, the electrolyte was a mixture of 25.55 wt % ethylene carbonate (EC), 60.95 wt % 2,2-difluoroethyl acetate (DFEA), 3.0% MA, and 10.49 wt % LiPF$_6$.

In Example 30, the electrolyte was a mixture of 24.55 wt % ethylene carbonate (EC), 59.95 wt % 2,2-difluoroethyl acetate (DFEA), 3.0% MA, 3.0% FEC, and 9.49 wt % LiPF$_6$.

In Example 31, the electrolyte was a mixture of 25.89 wt % ethylene carbonate (EC), 61.29 wt % 2,2-difluoroethyl acetate (DFEA), 1.0% GA, 1.0% FEC, and 10.83 wt % LiPF$_6$.

In Example 32, the electrolyte was a mixture of 25.89 wt % ethylene carbonate (EC), 61.29 wt % 2,2-difluoroethyl acetate (DFEA), 1.0% GA, 1.0% IA, and 10.83 wt % LiPF$_6$.

In Example 33, the electrolyte was a mixture of 25.89 wt % ethylene carbonate (EC), 61.29 wt % 2,2-difluoroethyl acetate (DFEA), 1.0% MA, 1.0% FEC, and 10.83 wt % LiPF$_6$.

In Example 34, the electrolyte was a mixture of 26.22 wt % ethylene carbonate (EC), 61.62 wt % 2,2-difluoroethyl acetate (DFEA), 0.5% MA, 0.5% FEC, and 11.16 wt % LiPF$_6$.

In Example 35, the electrolyte was a mixture of 26.22 wt % ethylene carbonate (EC), 61.62 wt % 2,2-difluoroethyl acetate (DFEA), 0.25% MA, 0.75% FEC, and 11.16 wt % LiPF$_6$.

In Example 36, the electrolyte was a mixture of 26.22 wt % ethylene carbonate (EC), 61.62 wt % 2,2-difluoroethyl acetate (DFEA), 0.75% MA, 0.25% FEC, and 11.16 wt % LiPF$_6$.

In Example 37, the electrolyte was a mixture of 25.22 wt % ethylene carbonate (EC), 60.62 wt % 2,2-difluoroethyl acetate (DFEA), 2.0% MA, 2.0% FEC, and 10.16 wt % LiPF$_6$.

In Example 38, the electrolyte was a mixture of 25.55 wt % ethylene carbonate (EC), 60.95 wt % 2,2-difluoroethyl acetate (DFEA), 1.0% MA, 2.0% FEC, and 10.49 wt % LiPF$_6$.

In Example 39, the electrolyte was a mixture of 25.55 wt % ethylene carbonate (EC), 60.95 wt % 2,2-difluoroethyl acetate (DFEA), 2.0% MA, 1.0% FEC, and 10.49 wt % LiPF$_6$.

In Example 40, the electrolyte was a mixture of 25.89 wt % ethylene carbonate (EC), 61.29 wt % 2,2-difluoroethyl acetate (DFEA), 0.5% MA, 1.5% FEC, and 10.83 wt % LiPF$_6$.

In Example 41, the electrolyte was a mixture of 25.89 wt % ethylene carbonate (EC), 61.29 wt % 2,2-difluoroethyl acetate (DFEA), 1.5% MA, 0.5% FEC, and 10.83 wt % LiPF$_6$.

In Example 42, the electrolyte was a mixture of 25.89 wt % ethylene carbonate (EC), 61.29 wt % 2,2-difluoroethyl acetate (DFEA), 2.0% MA, and 10.83 wt % LiPF$_6$.

In Comparative Examples 1 and 2, the electrolyte was a mixture of 26.5 wt % EC, 62.0% DFEA, and 11.5% LiPF$_6$.

In Comparative Examples 3 and 4, the electrolyte was a mixture of 26.5 wt % EC, 62.0% EMC, and 11.5% LiPF$_6$ (standard electrolyte, BASF, Independence, Ohio).

In Comparative Examples 5 and 6, the electrolyte was a mixture of 31.8 wt % EC, 54.8 wt % EMC, and 12.4 wt % LiPF$_6$, and 1% MA.

In Comparative Examples 7 and 8, the electrolyte was a mixture of 26.3 wt % ethylene carbonate (EC), 61.3 wt % 2,2-difluoroethyl acetate (DFEA), 1.0 wt % phthalic acid anhydride (PA, Sigma Aldrich, Milwaukee, Wis.), and 11.4 wt % LiPF$_6$.

In Comparative Example 9, the electrolyte was a mixture of 26.22 wt % EC, 61.62% EMC, 1.0% FEC, and 11.16 wt % LiPF$_6$.

In Comparative Example 10, the electrolyte was a mixture of 26.22 wt % EC, 61.62% DFEA, 1.0% FEC, and 11.16 wt % LiPF$_6$.

In Comparative Example 11, the electrolyte was a mixture of 25.89 wt % EC, 61.29% EMC, 1.0% MA, 1.0% FEC, and 10.83 wt % LiPF$_6$.

In Comparative Example 12, the electrolyte was a mixture of 26.22 wt % EC, 61.62% DFEA, 1.0% ES (ethylene sulfite, obtained from Aldrich), and 11.16 wt % LiPF$_6$.

In Comparative Example 13, the electrolyte was a mixture of 26.22 wt % EC, 61.62% DFEA, 1.0% VEC (vinyl ethylene carbonate, obtained from Aldrich), and 11.16 wt % LiPF$_6$.

In Comparative Example 14, the electrolyte was a mixture of 25.89 wt % EC, 61.29% DFEA, 2.0% FEC, and 10.83 wt % LiPF$_6$.

In Comparative Example 15, the electrolyte was a mixture of 25.55 wt % EC, 60.95% DFEA, 3.0% FEC, and 10.49 wt % LiPF$_6$.

In Comparative Example 16, the electrolyte was a mixture of 25.89 wt % EC, 61.29% EMC, 1.0% MA, 1.0% FEC, and 10.83 wt % LiPF$_6$.

The results shown in Table 1 demonstrate that the electrolytes containing a fluorinated acyclic carboxylic acid ester (i.e., DFEA), a co-solvent (i.e. EC), and a cyclic carboxylic acid anhydride, as disclosed herein (Examples 1-13) gave a significantly longer cycle life than the electrolyte containing a fluorinated acyclic carboxylic acid ester (i.e., DFEA) and a co-solvent (i.e. EC) without the cyclic carboxylic acid anhydride (Comparative Examples 1 and 2), the standard electrolyte (Comparative Examples 3 and 4), and the standard electrolyte containing a cyclic carboxylic acid anhydride (i.e., MA, Comparative Examples 5 and 6). The electrolyte containing DFEA, EC, and PhMA (Examples 14-16) gave a longer cycle life than the electrolyte containing EC and DFEA without a cyclic carboxylic acid anhydride (Comparative Examples 1 and 2) and the electrolyte containing EC, EMC and MA (Comparative Examples 5 and 6). The addition of the cyclic carboxylic acid anhydride to the standard electrolyte (Comparative Examples 5 and 6) produced a decrease in the cycle life compared to the standard electrolyte without the cyclic carboxylic acid anhydride additive (Comparative Examples 3 and 4). However, adding the cyclic carboxylic acid anhydride to the electrolyte containing the fluorinated solvent (Examples 1-16) produced a significant improvement in cycle life compared to the same electrolyte without the cyclic carboxylic acid anhydride additive (Comparative Examples 1 and 2). Clearly, there is an unexpected synergy between the fluorinated solvent electrolyte and the cyclic carboxylic acid anhydride additives disclosed herein.

The addition of the phthalic anhydride (Comparative Examples 7-8) resulted in cells with very low coulombic efficiency in the first formation cycle and hence low discharge capacities in the first cycle at 55° C., demonstrating that only selected cyclic carboxylic acid anhydride additives provide the improved performance of a combination of high capacity and high cycle life in this electrolyte system.

Comparative Examples 12-13 show that commonly used additives ethylene sulfite and vinyl ethylene carbonate, combined with fluorinated solvent electrolyte, gave poor performance.

Example 33 shows that the combination of the fluorinated solvent system with 1% FEC and 1% MA greatly improved cycle life (by a factor of 4) and coulombic efficiency relative to Comparative Example 11, in which the electrolyte composition was a non-fluorinated system with the same additives. When the cyclic carboxylic acid anhydride additive was not used either in the fluorinated solvent system of Comparative Example 10 or the non-fluorinated solvent system of Comparative Example 9, the cycle life was greatly diminished.

Example 38, in which the electrolyte composition contained 1% MA and 2% FEC, for a total additive concentration of 3%, shows more than 4-fold cycle life durability compared to Comparative Example 15, in which the electrolyte composition contained a single non-anhydride additive, FEC, at 3%.

Example 33, in which the electrolyte composition contained a fluorinated solvent system with 1% MA and 1% FEC, for a total additive concentration of 2%, shows a 2-fold increased cycle life durability compared to Comparative Example 14, in which the electrolyte composition contained 2% FEC, but no cyclic carboxylic acid anhydride additive.

Example 33, in which the electrolyte composition contained 1% FEC and 1% MA and a fluorinated solvent, has 4-fold cycle life durability compared to Comparative Example 11, in which the electrolyte composition contained the same sample additive concentrations but a non-fluorinated solvent. This result shows that the synergy between the cyclic carboxylic acid anhydride and other additives (e.g., FEC) does not extend to electrolytes without a fluorinated solvent.

TABLE 1

High Temperature Performance of Coin Cells

| Ex. | Solvents and Additive | CE 1st Cycle Formation | Discharge Capacity 1st cycle 55° C. (mAh/g) | CE 10th Cycle | Cycle Life 55° C. (cycles) | N |
|---|---|---|---|---|---|---|
| 1 | EC/DFEA + 1% MA | 74.5% | 104 | 99.36% | 269 | 1 |
| 2 | EC/DFEA + 1% MA | 72.0% | 89 | 99.17% | 290 | 1 |
| 3 | EC/DFEA + 1% GA | 84.3% | 114 | 99.05% | 61 | 1 |
| 4 | EC/DFEA + 1% GA | 84.1% | 117 | 99.24% | 86 | 1 |
| 5 | EC/DFEA + 1% DMMA | 65.1% | 103 | 98.40% | 64 | 1 |
| 6 | EC/DFEA + 1% DMMA | 65.8% | 108 | 98.42% | 60 | 1 |
| 7 | EC/DFEA + 1% DMMA | 66.8% | 107 | 98.29% | 55 | 1 |
| 8 | EC/DFEA + 1% MMA | 72.8% | 106 | 98.97% | 144 | 1 |
| 9 | EC/DFEA + 1% MMA | 72.0% | 106 | 98.95% | 151 | 1 |
| 10 | EC/DFEA + 1% MMA | 73.5% | 110 | 98.96% | 103 | 1 |
| 11 | EC/DFEA + 1% CpMA | 74.4% | 114 | 98.60% | 59 | 1 |
| 12 | EC/DFEA + 1% CpMA | 74.4% | 111 | 98.82% | 68 | 1 |
| 13 | EC/DFEA + 1% CpMA | 74.6% | 105 | 98.63% | 63 | 1 |
| 14 | EC/DFEA + 1% PhMA | 67.4% | 81 | 98.13% | 46 | 1 |
| 15 | EC/DFEA + 1% PhMA | 66.6% | 104 | 98.29% | 51 | 1 |
| 16 | EC/DFEA + 1% PhMA | 65.7% | 106 | 98.26% | 48 | 1 |
| 17 | EC/DFEA + 0.5% MA + 0.5% FEC | 74.3% | 109 | 98.90% | 78 | 3 |
| 18 | EC/DFEA + 0.25% MA + 0.75% FEC | 75.7% | 109 | 99.02% | 124 | 3 |
| 19 | EC/DFEA + 0.75% MA + 0.25% FEC | 73.2% | 103 | 99.12% | 172 | 2 |
| 20 | EC/DFEA + 1% CA + 1% FEC | 73.9% | 111 | 99.14% | 111 | 3 |
| 21 | EC/DFEA + 1% IA + 1% FEC | 79.5% | 114 | 99.34% | 155 | 3 |
| 22 | EC/DFEA + 0.1% GA | 75.8% | 108 | 97.39% | 29 | 2 |
| 23 | EC/DFEA + 0.5% GA | 85.5% | 115 | 99.02% | 55 | 1 |
| 24 | EC/DFEA + 1% GA | 84.5% | 112 | 99.19% | 161 | 1 |
| 25 | EC/DFEA + 1% MA + 0.3% GA | — | 96 | 99.41% | 344 | 2 |
| 26 | EC/DFEA + 1% MA + 0.1% GA | — | 104 | 99.30% | 208 | 2 |
| 27 | EC/DFEA + 0.3% MA + 0.3% GA | — | 108 | 99.09% | 96 | 2 |
| 28 | EC/DFEA + 0.3% MA + 0.1%GA | — | 104 | 98.82% | 92 | 2 |
| 29 | EC/DFEA + 3% MA | — | 74 | 99.01% | 65 | 3 |
| 30 | EC/DFEA + 3% MA + 3% FEC | — | 74 | 99.29% | 214 | 3 |
| 31 | EC/DFEA + 1% GA + 1% FEC | 75.8% | 105 | 99.07% | 102 | 2 |
| 32 | EC/DFEA + 1% GA + 1% IA | 75.0% | 99 | 99.17% | 156 | 3 |
| 33 | EC/DFEA + 1% MA + 1% FEC | 71.2% | 102 | 99.31% | 280 | 3 |
| 34 | EC/DFEA + 0.5% MA + 0.5% FEC | 74.4% | 109 | 98.90% | 77 | 3 |
| 35 | EC/DFEA + 0.25% MA + 0.75% FEC | 75.7% | 109 | 99.02% | 124 | 3 |
| 36 | EC/DFEA + 0.75% MA + 0.25% FEC | 73.2% | 103 | 99.12% | 172 | 2 |
| 37 | EC/DFEA + 2% MA + 2% FEC | 63.3% | 93 | 99.26% | 373 | 3 |
| 38 | EC/DFEA + 1% MA + 2% FEC | 55.6% | 98 | 99.41% | 311 | 2 |
| 39 | EC/DFEA + 2% MA + 1% FEC | 71.3% | 84 | 99.10% | 379 | 2 |
| 40 | EC/DFEA + 0.5% MA + 1.5% FEC | 84.0% | 107 | 99.43% | 239 | 3 |
| 41 | EC/DFEA + 1.5% MA + 0.5% FEC | 90.6% | 100 | 99.39% | 368 | 2 |
| 42 | EC/DFEA + 2% MA | 63.0% | 90 | 99.36% | 343 | 2 |
| Comp. 1 | EC/DFEA | 76.6% | 100 | 94.99% | 11 | 1 |
| Comp. 2 | EC/DFEA | 84.8% | 112 | 95.10% | 10 | 1 |

TABLE 1-continued

High Temperature Performance of Coin Cells

| Ex. | Solvents and Additive | CE 1st Cycle Formation | Discharge Capacity 1st cycle 55° C. (mAh/g) | CE 10th Cycle | Cycle Life 55° C. (cycles) | N |
|---|---|---|---|---|---|---|
| Comp. 3 | EC/EMC | 79.2% | 116 | 98.49% | 42 | 1 |
| Comp. 4 | EC/EMC | 79.7% | 117 | 98.64% | 53 | 1 |
| Comp. 5 | EC/EMC + 1% MA | 91.0% | 103 | 96.46% | 24 | 1 |
| Comp. 6 | EC/EMC + 1% MA | 76.6% | 89 | 95.88% | 30 | 1 |
| Comp. 7 | EC/DFEA + 1% PA | 50.5% | 68 | 96.22% | 93 | 1 |
| Comp. 8 | EC/DFEA + 1% PA | 54.7% | 71 | 96.83% | 68 | 1 |
| Comp. 9 | EC/EMC + 1% FEC | 78.8% | 106 | 98.51% | 54 | 2 |
| Comp. 10 | EC/DFEA + 1% FEC | 77.8% | 108 | 98.85% | 66 | 3 |
| Comp. 11 | EC/EMC + 1% MA+ 1% FEC | 74.2% | 104 | 94.44% | 61 | 5 |
| Comp. 12 | EC/DFEA + 1% ES | 12.4% | 33 | 80.52% | 5 | 3 |
| Comp. 13 | EC/DFEA + 1% VEC | 54.4% | 88 | 97.49% | 38 | 3 |
| Comp. 14 | EC/DFEA + 2% FEC | 79.6% | 93 | 98.87% | 142 | 1 |
| Comp. 15 | EC/DFEA + 3% | — | 72 | 99.28% | 75 | 3 |

Examples 43-46 and Comparative Examples 16-17

Pouch Cells and Area Specific Impedance

Cathodes were prepared by a procedure similar to that described above, except the weight ratios in the dried cathodes were active:PVDF binder:carbon black=86:7:7 and the carbon black was Super C65 (Timcal, Westlake, Ohio). Cathodes were punched out to 31.3×45 mm$^2$ size and the average loading of cathode active material was 9.1 mg/cm$^2$. Anodes were prepared by a similar procedure to that described above, but were punched out to 32.4×46.0 mm$^2$ and the anode active loading was 4.8 mg/cm$^2$. Single-layer pouch cells were assembled using microporous polyolefin separators (Celgard 2500, Charlotte, N.C.), Al and Ni tabs ultrasonically welded to the current collectors, and a foil-polymer laminate pouch material (MTI Corp., Richmond, Calif.). The cells with one edge still open were dried under vacuum at 60° C. and brought into an Ar-filled dry box. Then, the electrolytes shown in Table 2 were injected into the cells, and the cells were vacuum sealed. In preparing the electrolytes shown in Table 2, the solvents EC and DFEA were first mixed and dried using sieves, than the salt added to make a base electrolyte. The MA was purified and dried by sublimation and the FEC was dried with molecular sieves, Finally, the additives MA and/or FEC were added to the base electrolyte. The cells were mounted in fixtures which applied 0.32 MPa pressure to the active area of the pouch.

The cells were subjected to two formation cycles between voltage limits of 3.4-4.9 V at 25° C. and using constant currents (CC) of 12 mA per g of cathode active material. The cells were then cycled twice at 3.4-4.9 V using CC charges at 40 mA/g plus a current taper at constant voltage (CV) to 2.4 mA/g, and CC discharges of 40 mA/g without CV. Cell capacities were calculated from the second CC discharge of 40 mA/g without CV. The cells were then cycled five times with both charges and discharges at 240 mA/g.

Following the five cycles at room temperature, the pulse power characteristics of the cells were measured as follows. The cells were fully discharged at room temperature by discharging to 3.4 V at C/3 followed by a CV hold until the current reached 0.02 C. Based on the cell capacities calculated above, the cells were charged at 25° C. to 60% state of charge (SOC) at C/3 and then held at open circuit for 10 min to stabilize the voltage. The response of the battery to short discharge pulses was measured for sequential discharge currents of C/3, C/1, 3 C, and 5 C, as described below.

The measurement at C/3 was carried out by subjecting the battery to a 10 s pulse at C/3 discharge current. At the end of the pulse, the battery was left at open circuit for 10 min. The discharge pulse resulted in a small reduction in the state of charge of the battery. In order to return the battery to 60% SOC, the battery was then recharged for 10 s at C/3. The battery was then held at open circuit for 10 min. The measurement at C/1 was carried out next by applying a discharge current of 1 C for 10 s. This was followed by 10 min at open circuit, recharging the battery back to 60% SOC by charging at C/3 for 30 s, and a 10 min hold at open circuit. The measurement at 3 C was carried out next by applying a discharge current of 3 C for 10 s. This was followed by 10 min at open circuit, recharging the battery back to 60% SOC at C/3 for 90 s, and a 10 min hold at open circuit. The final pulse power measurement at 5 C was carried out by discharging the battery at 5 C for 10 s. This was followed by 10 min at open circuit, recharging the battery back to 60% SOC at C/3 for 150 s and a 10 min hold at open circuit.

The pulse power performance is characterized by the resistance, or impedance, of the cell to a DC current pulse. This impedance, which has units of ohms ($\Omega$), is a measure of the ability of a cell to provide high power output and high battery efficiency for short discharge and charge pulses. Low impedance is preferred. In order to compare results between laboratories, the impedance is normalized for the area of the cell by multiplying it by the geometric areas of the limiting electrode in the cell to yield the area specific impedance (ASI), with units of $\Omega \cdot cm^2$.

The measured ASI is a function of the battery design, the properties of the materials used in the battery, and the characteristics (time and current) of the DC pulse. By changing the electrolyte while keeping the other components of the battery constant and using identical current pulses, the technique provides information on the performance characteristics of the electrolyte.

The ASI was calculated for each of the power pulses at C/3, C/1, 3 C and 5 C as follows. The voltage drop during the 10 s pulse $\Delta V$ was measured by subtracting the voltage measured at the end of the DC current pulse (while the discharge current is still being applied) from the voltage immediately prior to the application of the DC current pulse (while the battery is still at open circuit). The ASI was then calculated from the formula:

$$ASI(ohm \cdot cm^2) = \Delta V(volt) \times A(cm^2)/I(A)$$

where I is the current during the discharge pulse and A is the geometric area of the limiting electrodes, which was the cathode for the pouch cells on which this measurements were carried out. For the combination of materials used in the measurements reported here, the ASI was weakly dependent on the discharge current. Values for the ASI measured at 5 C and 25° C. are reported in Table 2.

As can be seen from the data in Table 2, the combination of the MA and FEC additives in Examples 45 and 46 gave an ASI of 23 to 23.8 ohm·cm². This additive combination is able to give a lower ASI than MA alone (27.2 to 27.8 ohm·cm², as shown in Examples 43 and 44), while at the same time giving significantly higher cycle life (Example 33) than the electrolyte with FEC alone (Comparative Example 10).

TABLE 2

Results of Area Specific Impedance Measurements of Pouch Cells

| Examples | Solvent & Additives | ASI (ohm · cm²) |
| --- | --- | --- |
| Comp. 16 | EC:DFEA 30:70 + 1% FEC | 22.3 |
| Comp. 17 | EC:DFEA 30:70 + 1% FEC | 22.2 |
| 43 | EC:DFEA 30:70 + 1% MA | 27.2 |
| 44 | EC:DFEA 30:70 + 1% MA | 27.8 |
| 45 | EC:DFEA 30:70 + 1% MA + 1% FEC | 23.0 |
| 46 | EC:DFEA 30:70 + 1% MA + 1% FEC | 23.8 |

Comparative Example 18

Electrolyte Composition Containing 2,2-Difluoroethyl Propionate and Ethylene Carbonate—Conductivity and Freezing Point Preparation of 2,2-Difluoroethyl Propionate The following is a description of a typical procedure used to prepare 2,2-difluoroethyl propionate. Potassium propionate (Aldrich, 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 75 g (0.67 mol, 10 mol % excess) of the dried potassium propionate was placed into a 500 mL, 3 neck round bottom flask containing a heavy magnetic stir bar. The flask was removed from the dry box, transferred into a fume hood, and equipped with a thermocouple well, a dry-ice condenser, and an additional funnel. Sulfolane (300 mL, Aldrich 99%, 600 ppm of water as determined by Karl Fischer titration) was melted and added to the 3 neck round bottom flask as a liquid under a flow of nitrogen. Agitation was started and the temperature of the reaction mixture was brought to about 100° C. $HCF_2CH_2Br$ (87 g, 0.6 mol, E.I. du Pont de Nemours and Company, 99%) was placed in the addition funnel and was slowly added to the reaction mixture. The addition was mildly exothermic and the temperature rose to 120-130° C. in 15-20 min after the start of the addition. The addition of $HCF_2CH_2Br$ was kept at a rate which maintained the internal temperature at 125-135° C. The addition took about 2-3 h. The reaction mixture was agitated at 120-130° C. for an additional 6 h (typically the conversion of bromide at this point was about 90-95%). Then, the reaction mixture was cooled down to room temperature and was agitated overnight. Next morning, heating was resumed for another 8 h.

At this point, the starting bromide and 1,1-difluoroethanol were not detectable in the crude reaction mixture by NMR. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 3 h and resulted in 48 g of crude $HCF_2CH_2OC(O)C_2H_5$ of about 98% purity. Further purification of the crude product was carried out using spinning band distillation at atmospheric pressure. The fraction having a boiling point between 120.3-120.6° C. was collected and the impurity profile was monitored using GC/MS (capillary column HP5MS, phenyl-methyl siloxane, Agilent 19091S-433, 30 m, 250 μm, 0.25 μm; carrier gas —He, flow rate 1 mL/min; temperature program: 40° C., 4 min, temp. ramp 30° C./min, 230° C., 20 min). The crude product (43 g) had a purity of 99.91% and contained about 300 ppm of water. Water was removed from the product by treatment with 3 A molecular sieves, until water was not detectable by Karl Fischer titration (i.e., <1 ppm).

$HCF_2CH_2OC(O)C_2H_5$: $^1$H NMR (CDCl$_3$): 1.10 (3H, t), 2.35 (2H, q), 4.21 (2H, td), 5.87 (1H, tt) ppm; $^{19}$F NMR (CDCl$_3$): −125.68 (dt, 56.6, 13.7 Hz) ppm, GS/MS (m/z): 138 ($M^+$, $C_5H_8F_2O_2^+$).

Preparation of Nonaqueous Electrolyte Composition Containing 2,2-Difluoroethyl Propionate (DFEP) and Ethylene Carbonate (EC)

2,2-Difluoroethyl propionate, prepared as described above, was purified by spinning band distillation twice to 99.990% purity, as determined by gas chromatography using a mass spectrometric detector. The purified 2,2-difluoroethyl acetate and ethylene carbonate (anhydrous, Novolyte, Independence, Ohio) were mixed together to make 9.0 mL of total solution in a 70:30 w/w ratio, and the resulting mixture was dried over 3 A molecular sieves (Sigma-Aldrich, Milwaukee, Wis.). After drying, the water content was determined to be <0.5 ppm using Karl Fischer titration. The solution was syringe filtered through a 0.2 μm PTFE syringe filter. To 9.0 mL of the resulting solution was added lithium hexafluorophosphate (battery grade, Novolyte) to give a concentration of 1.0 M. The mixture was shaken for a few minutes until all of the solid was dissolved.

Ionic Conductivity of the Electrolyte Composition

The ionic conductivity of the electrolyte was measured using ac impedance spectroscopy over the frequency range of 0.1 to 1,000,000 Hz. The impedance results were fitted with an equivalent circuit model to yield the dc resistance.

An electrical probe containing two wires was first calibrated over the conductivity range of 10 to 100,000 Hz using standard aqueous solutions of sodium chloride. Then, the electrical probe was placed in the electrolyte composition to be measured. Ionic conductivity measurements were recorded at temperatures of 22 to 25° C. in a dry box. Results were extrapolated to 25° C. using the temperature dependence of 2.0%1° C. The conductivity of the electrolyte at 25° C. was measured to be 6.8 mS/cm. The electrolyte was frozen at a temperature of −30° C.

Example 47

Electrolyte Composition Containing a Mixture of 2,2-Difluoroethyl Propionate and 2,2-Difluoroethyl Acetate and Ethylene Carbonate—Conductivity and Freezing Point The electrolyte composition containing 2,2-difluoroethyl propionate and ethylene carbonate from Comparative Example 18 (30 parts by weight) was combined with the electrolyte composition described in Comparative Examples 1 and 2 (70 parts by weight) to prepare an electrolyte composition containing a mixture of the fluorinated solvents 2,2-difluoroethyl propionate and 2,2-difluoroethyl acetate, and ethylene carbonate. The ionic conductivity of this electrolyte composition was measured as described in Comparative Example 18 and was found to be 7.4 mS/cm at 25° C.

The electrolyte was a liquid at −30° C.

This example demonstrates the advantages of higher conductivity and higher freezing point of the electrolyte composition containing a mixture of 2,2-difluoroethyl propionate and 2,2-difluoroethyl acetate compared to an electrolyte composition containing only 2,2-difluoroethyl propionate (Comparative Example 18).

Example 48

Film Formation on Graphite Electrode

Graphite anodes were prepared as described above Preparation and Electrochemical Cycling of Coin Cells Nonaqueous electrolyte lithium-ion CR2032 coin cells were prepared for electrochemical evaluation. The coin cell parts (case, spacers, wave spring, gasket, and lid) and coin cell crimper were obtained from Hohsen 15 Corp (Osaka, Japan). The coin cells were assembled in an argon dry box in the following order: can, polypropylene gasket, 16.0 mm×0.5 mm spacer, 14.3 mm graphite electrode, four drops of electrolyte, 16.8 mm Celgard CG2500 separator, three drops electrolyte, 14.5 mm×275 μm lithium electrode, 16.0 mm×1.0 mm spacer, wave spring, and cap. The cell was crimped using a Hoshen auto crimper.

The nonaqueous electrolyte was prepared by combining 2,2-difluoroethanol and ethylene carbonate with 1.0 M lithium hexafluorophosphate to give a 70/30 v/v solution. Maleic anhydride and glutaric anhydride (Sigma-Aldrich) were added to the above solution at 1% and 0.3% w/w, respectively.

The assembled coin cells were each cycled using cyclic voltammety at 0.1 mV/s between three voltage ranges using a Solartron 1470E potentiostat/galvanostat (Solartron Analytical, Farnborough, UK): 5 min hold at 2 V, then 2 V to 1 V to 2 V, 5 min hold at 2 V, then 2 V to 0.5 V to 2 V, and 5 min hold at 2 V, then 2 V to 0.01 V to 2 V. After one cycle, the cells were disassembled in an argon dry box. The graphite electrode was rinsed with ethylmethyl carbonate and allowed to dry. The dry electrodes were stored in a sealed vial under argon, then analyzed by scanning electron microscopy (SEM). An untreated graphite electrode was also analyzed using SEM (FIG. 1).

SEM Analysis

The graphite electrodes were first examined for consistent visual appearance across the sample. A 3 mm by 5 mm rectangular section was cut from the approximate center of the electrodes using dissecting scissors. This section was affixed to the SEM sample carrier using double sided conductive carbon tape. This graphite electrode sample was then examined in a Hitachi model S-5000SPX HRSEM equipped with a Noran System Six EDS attachment. Images were acquired at magnifications of 5,000×, 25,000×, 50,000×, and 100,000× with an accelerating voltage of 1.5 kV, using 1280 by 960 capture resolution and frame integration of 128 frames.

Chemical analysis using energy dispersive X-ray spectroscopy (EDS) was performed on selected regions of the graphite electrode sample using an acceleration voltage of 5 kV, with X-rays collected in an energy range from 0 to 5 keV, for a time period sufficient to generate a carbon peak containing greater than 40,000 counts at full width half maximum (FWHM).

Figure 2:
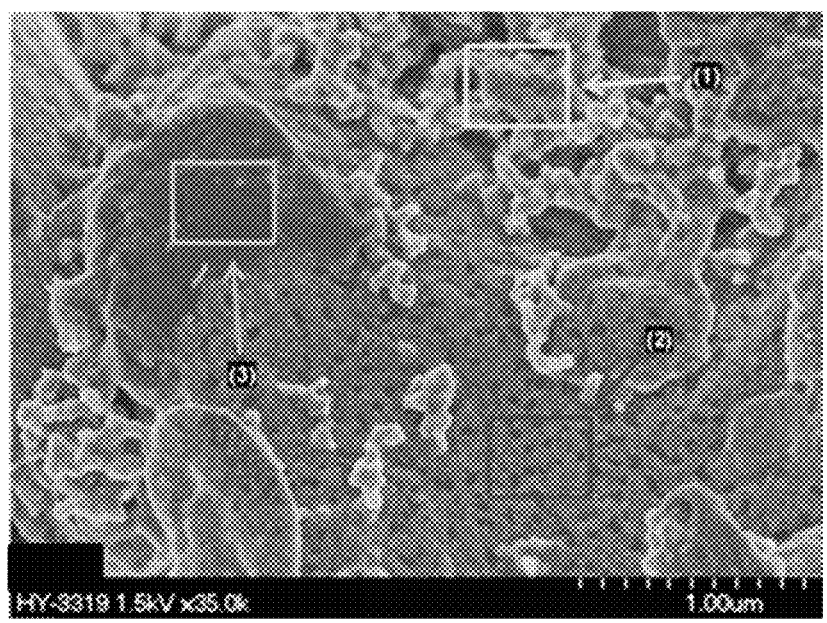
FIG. 2 is a scanning electron micrograph of a graphite electrode cycled in a coin cell cycled to a lower potential of 1.0 V versus lithium, which shows that a film was not formed, as described in Example 48 herein.

The SEM results indicated that under potential conditions at 1 V and above, thin, incomplete coverage occurred, as shown in the electron micrograph of FIG. 2. Regions of exposed graphite indicate that a film, as defined herein, had not formed.

Chemical analysis of one section of the graphite electrode (Section 3 in FIG. 2) found high carbon content but no observable fluorine, oxygen, or phosphorus. However, in two other sections (Section 1 and 2 in FIG. 2), carbon, fluorine, oxygen, and phosphorus were observed, which indicated little to no coverage of the graphite electrode surface was seen in the resulting electron micrograph, indicating that a film had not formed in this potential range. Section 2 had less observable C, F, O, and P than Section 1.

Figure 3:
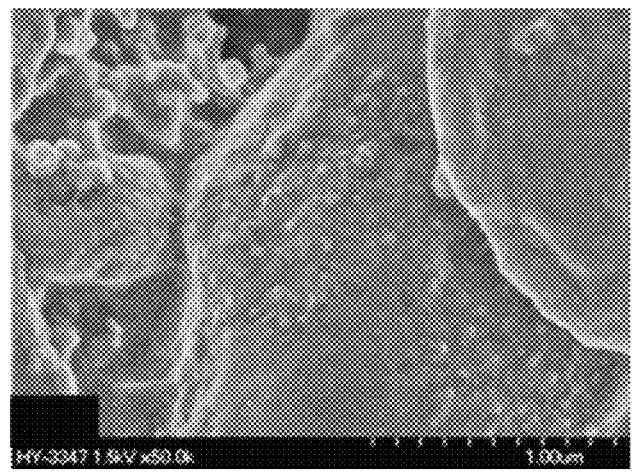
FIG. 3 is a scanning electron micrograph of a graphite electrode cycled in a coin cell cycled to a lower potential of 0.01 V versus lithium, which shows that a film was formed, as described in Example 48 herein.

Under potential conditions below 1 V, a thick coating was formed on the graphite electrode and no exposed graphite was observed in the electron micrograph (FIG. 3), indicating the formation of a film. High quantities of C, F, O, and P were also found by chemical analysis at all areas analyzed.

Comparative Example 19

Film Not Formed on Graphite Electrode

Figure 4:
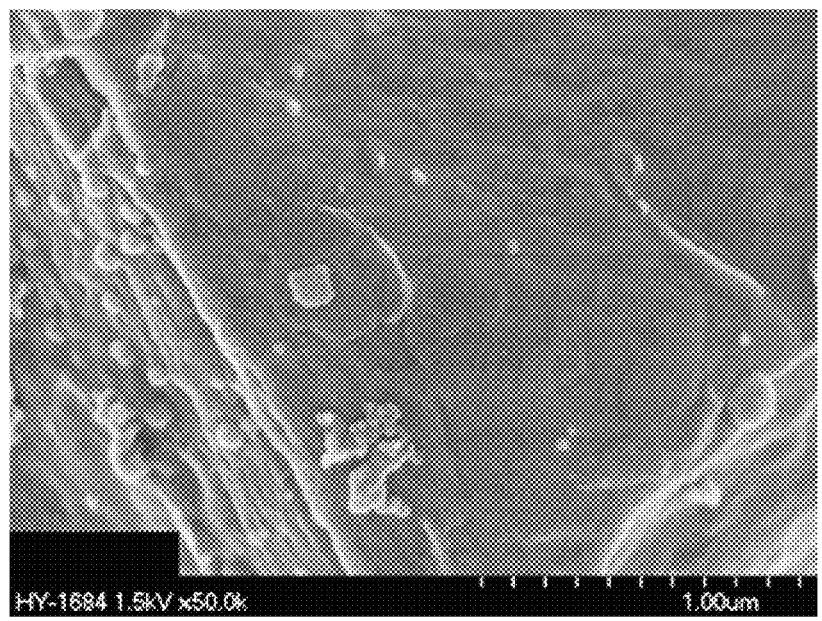
FIG. 4 is a scanning electron micrograph of a graphite electrode cycled in a coin cell to a lower potential of 0.01 V versus lithium, which shows that a film was not formed, as described in Comparative Example 19 herein.

A coin cell was prepared as described in Example 48 using an electrolyte containing EC:DFEA 30:70 and 1.0 M LiPF$_6$. The coin cell was cycled and the graphite electrode analyzed by SEM, as described in Example 48. Little to no coverage of the graphite electrode surface was seen in the resulting electron micrograph (FIG. 4), indicating that a film had not formed in the 0.01 V to 2 V range.

Comparative Example 20

Film Not Formed on Graphite Electrode

Figure 5:
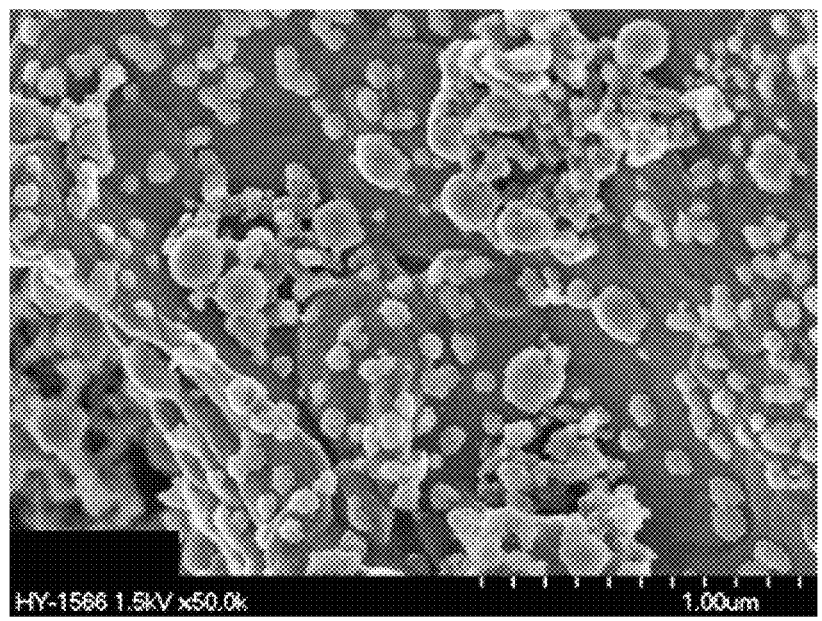
FIG. 5 is a scanning electron micrograph of a graphite electrode cycled in a coin cell to a lower potential of 0.01 V versus lithium, which shows that a film was not formed, as described in Comparative Example 20 herein.

A coin cell was prepared as described in Example 48 using an electrolyte containing EC:DFEA 30:70 plus 1% FEC and 1.0 M LiPF$_6$. The coin cell was cycled and the graphite electrode analyzed by SEM, as described in Example 48. Exposed graphite on the electrode surface was seen in the resulting electron micrograph (FIG. 5), indicating that a film had not formed in the 0.01 V to 2 V range.

Example 49

Film Formation on Graphite Electrode

Figure 6:
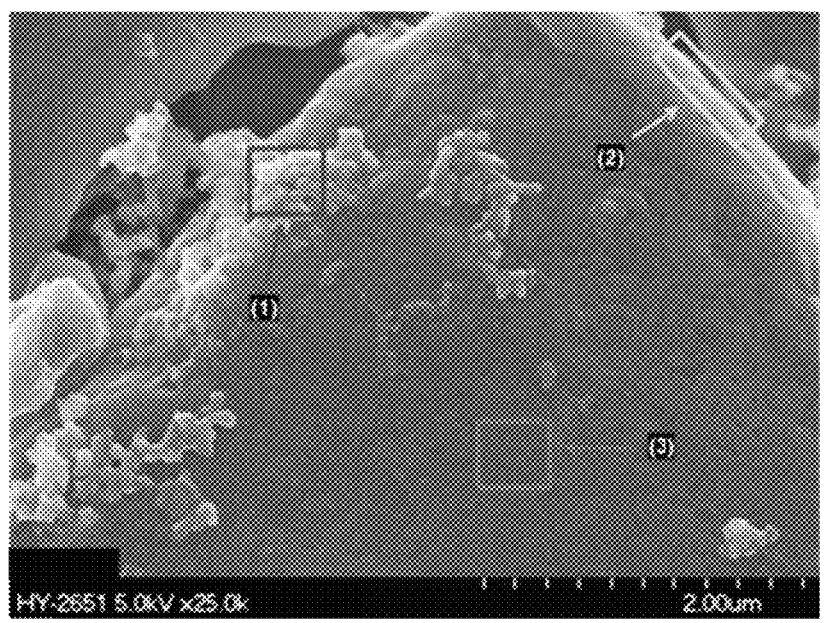
FIG. 6 is a scanning electron micrograph of a graphite electrode cycled in a coin cell to a lower potential of 1.0 V versus lithium, which shows that a film was not formed, as described in Example 49 herein.

A coin cell was prepared as described in Example 48 using an electrolyte containing EC:DFEA 30:70 plus 1% FEC, 1% MA and 1.0 M LiPF$_6$. The coin cell was cycled and the graphite electrode analyzed by SEM, as described in Example 48. The SEM results indicated that under potential conditions at 1 V and above, thin, incomplete coverage occurred (FIG. 6). Chemical characterization of Section 3 in FIG. 6 found high carbon content but small quantities of observable fluorine, oxygen, or phosphorus. However in Sections 1 and 2 in FIG. 6, carbon, fluorine, oxygen, and phosphorus were observed, which is believed to be due to the break-down or the degradation of the additives. Section 2 had less observable C, F, O, and P than Section 1. Exposed graphite was observable in Sections 2 and 3, indicating that a film had not been formed.

Figure 7:
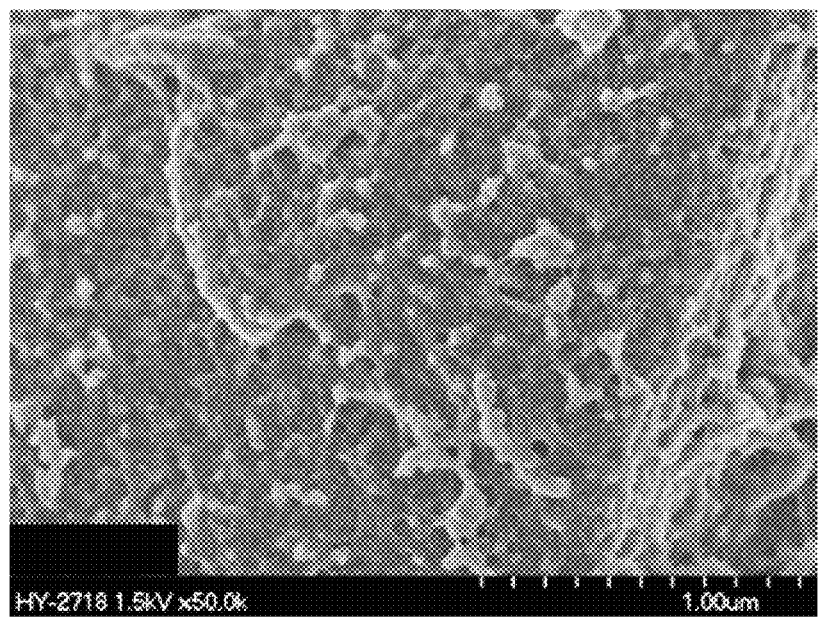
FIG. 7 is a scanning electron micrograph of a graphite electrode cycled in a coin cell to a lower potential of 0.01 V versus lithium, which shows that a film was formed, as described in Example 49 herein.

Under potential conditions below 1 V, a thick coating was formed and no exposed graphite was observed in the micrograph (FIG. 7), indicating that a film had been formed. High quantities of C, F, O, and P were also found by chemical analysis.

Example 50 and Comparative Example 19

Cathodes, anodes, and single-layer pouch cells were prepared by the same procedure as that described in Examples 43-46 and Comparative Examples 16-17. The solvent was a mixture of 75 wt % FEC and 25 wt % DFEA. After addition of 1.0 M $LiPF_6$, 1.0 wt % maleic anhydride was added as an additive. A comparative example was prepared using a mixture of 75 wt % FEC, 25 wt % DFEA, and 1.0 M $LiPF_6$ The cells were then subjected to the same formation process, measurement of cell capacity and five room temperature cycles as described above.

The pulse power was measured as described above, yielding the area specific impedance. The values for the area specific impedance are shown in Table 3.

The pouch cells were then placed in an oven at 55° C. and cycled at a current of 240 mA per gram of cathode material, which is approximately a 2 C rate. The results are summarized in Table 4, which provides the solvents and additives used, the number of cycles completed at 55° C., the Coulombic efficiency (CE) measured in the first cycle of formation, the discharge capacity in the first cycle at 55° C. per gram of cathode active materials, the CE in the 10th cycle, and the cycle life at 55° C.

TABLE 3

Results of Area Specific Impedance Measurements on Pouch Cells

| Examples | Solvent and Additives | ASI (ohm-$cm^2$) |
| --- | --- | --- |
| Comparative 18 | FEC:DFEA 25:75 | 21.3 |
| 49 | FEC:DFEA 25:75 + 1.0% MA | 22.3 |

TABLE 4

High Temperature Performance of Pouch Cells

| Example | Solvents and Additives | CE $1^{st}$ Cycle Formation | Discharge Capacity $1^{st}$ cycle 55° C. (mAh/g) | CE $10^{th}$ Cycle | Cycle Life 55° C. (cycles) |
| --- | --- | --- | --- | --- | --- |
| Comparative 18 | 75:25 DFEA:FEC | 74.22 | 97 | 99.34 | 162 |
| 49 | 75:25 DFEA:FEC + 1% MA | 73.04 | 96 | 99.51 | 204 |

Example 51

DFEA/DFMC/DMC/EC/LiBOB 28 wt % DFEA/28 wt % DFMC/14 wt % DMC/30 wt % EC with 1 M $LiPF_6$ 2 wt % LiBOB, 98 wt % (Co-Solvents and $LiPF_6$)

Preparation of the Cathode Electrode Cathode Electrode

The cathode electrodes were prepared by the following procedure.

Preparation of Primer on Aluminum Foil Current Collector—Using a Polyimide/Carbon Composite To prepare the polyamic acid, a prepolymer was first prepared. 20.6 wt % of PMDA:ODA (pyromellitic dianhydride//ODA (4,4'-diaminodiphenyl ether)) prepolymer was prepared using a stoichiometry of 0.98:1 PMDA/ODA prepolymer. This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98:1.

In a separate container, a 6 wt % solution of pyromellitic anhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield viscometer—#6 spindle). This resulted in a finished prepolymer solution in which the calculated final PMDA:ODA ratio was 1.01:1.

5.196 grams of the finished prepolymer was then diluted with 15.09 grams of NMP to create a 5 wt % solution. In a vial, 16.2342 grams of the diluted finished prepolymer solution was added to 0.1838 grams of TimCal Super C-65 carbon black. This was further diluted with 9.561 grams of NMP for a final solids content of 3.4 wt %, with a 2.72 prepolymer:carbon ratio. A Paasche VL #3 Airbrush sprayer (Paasche Airbrush Company, Chicago, Ill.) was used to spray this material onto the aluminum foil (25 μm thick, 1145-0, Allfoils, Brooklyn Heights, Ohio). The foil was weighed prior to spraying to identify the necessary coating to reach a desired density of 0.06 mg/cm2. The foil was then smoothed onto a glass plate, and sprayed by hand with the airbrush until coated. The foil was then dried at 125° C. on a hot plate, and measured to ensure that the desired density was reached. The foil was found to be coated with 0.06 mg/$cm^2$ of the polyamic acid. Once the foil was dried and at the desired coating, the foil was imidized at 400° C. following the imidization procedure below.

40° C. to 125° C. (ramp at 4° C./min)
125° C. to 125° C. (soak 30 min)
125° C. to 250° C. (ramp at 4° C./min)
250° C. to 250° C. (soak 30 min)
250° C. to 400° C. (ramp at 5° C./min)
400° C. to 400° C. (soak 20 min)

Coating of the Cathode Electroactive Layer onto the Primed Al Foil

Preparation of the Paste

The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.0352 g Farasis 1,1,1 NMC (NiCoMg, Farasis Energy, Hayward, Calif.) cathode active powder; 0.3342 g carbon black (Denka uncompressed, DENKA Corp., Japan); 6.0971 g PVDF (polyvinylidene difluoride) solution; and 2.1491 g (portion 1)+0.3858 g NMP (portion 2) (Sigma Aldrich). The materials were combined in a ratio of 90:5:5, cathode active powder:PVDF:carbon black, as described below. The final paste contained 44.7 wt % solids.

The carbon black, the first portion of NMP, and the PVDF solution were first combined in a plastic THINKY container and centrifugally mixed (ARE-310, Thinky USA, Inc., Laguna Hills, Calif.) for 2 minutes at 2000 rpm. The cathode active powder and the $2^{nd}$ portion of NMP were added and the paste was centrifugally mixed once again at 2000 rpm for 2 minutes. The paste was then immersed in a sonic horn for 3 seconds.

The aluminum foil (25 μm thick, 1145-0, Allfoils, Brooklyn Heights, Ohio) was pretreated with a polyimide/carbon primer.

Coating and Calendaring the Cathode Electrode

The paste was manually cast using doctor blades with a 5 mil gate height plus 2 mil of Kapton® tape onto the primed aluminum foil. The electrodes were dried for 60 min at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar is set to have a nip force (in lb)=37.8 X regulator pressure (psi). Loadings of cathode active material were approximately 7.85-8.06 mg/cm$^2$.

Preparation of the Anode Electrode

The following is a typical procedure used for the preparation of the anodes used in the Examples below. An anode paste is prepared from the following materials: 5.00 g graphite (CPreme® G5, Conoco-Philips, Huston, Tex.); 0.2743 g carbon black (Super C65, Timcal, Westlake, Ohio); 3.06 g PVDF (13% in NMP. KFL #9130, Kureha America Corp.); 11.00 g 1-methyl-2-pyrrolidinone (NMP); and 0.0097 g oxalic acid. The materials are combined in a ratio of 88:0.17:7:4.83, graphite:oxalic acid:PVDF:carbon black, as described below. The final paste contains typically 29.4% solids.

Oxalic acid, carbon black, NMP, and PVDF solution are combined in a plastic vial. The materials are mixed for 60 sec. at 2000 rpm using a planetary centrifugal mixer. The mixing is repeated a second time. The graphite is then added. The resulting paste is centrifugally mixed two times. The vial is mounted in an ice bath and homogenized twice using a rotor-stator for 15 min each time at 6500 rpm and then twice more for 15 min at 9500 rpm. The point where the stator shaft entered the vial is wrapped with aluminum foil to minimize water vapor ingress to the vial. Between each of the four homogenization periods, the homogenizer is moved to another position in the paste vial. The paste is then centrifugally mixed three times.

The paste is cast using a doctor blade with a 230 μm gate height on to copper foil (CF-LBX-10, Fukuda, Kyoto, Japan) using the automatic coater. The electrodes are dried for 30 min at 95° C. in the mechanical convection oven. The resulting 51-mm wide anodes are placed between 125 μm thick brass sheets and passed through a calender three times using 100 mm diameter steel rolls at ambient temperature with nip forces increasing in each of the passes, starting at 260 kg with the final pass at 770 kg.

The loading of the anode active component is approximately 4.4-4.5 mg/cm2.

Synthesis of 2,2-Difluoroethyl Methyl Carbonate

A solution of 2,2-difluoroethanol (125 g; 1.52 mol; mw=82.05; D=1.30; bp=95° C.; Synquest 2101-3-02) and pyridine (139 g; 1.76 mol; mw=79.1; D=0.98; Aldrich 270970) in 1 L anhydrous dichloromethane (ECD) was placed under nitrogen in a 3-neck, 3-L RB flask with overhead stirring and dropping funnel attached. The solution was cooled by stirring in an ice bath. Methyl chloroformate (166 g; 1.76 mol; mw=94.50; D=1.22; bp=70° C., Aldrich M35304) was placed in the dropping funnel and was added to the stirred solution of difluoroethanol and pyridine over 30 min. When about 100 mL of methyl chloroformate had been added, pyridine HCl suddenly precipitated and the mixture became a white slurry. The mixture was stirred for 30 min. The ice bath was removed and the mixture stirred at RT for 65 hr.

The reaction mixture was filtered to remove pyridine hydrochloride and the white solids were rinsed once with 100 mL dichloromethane. The filtrate was washed first with 150 mL 1N aqueous HCl, then 60 mL 10% HCl, and finally 40 mL 10% HCl. The filtrate was washed with 80 mL 5% sodium carbonate and the organic layer was separated and dried over anhydrous MgSO$_4$ for 3 hr.

After suction-filtration, the filtrate was distilled under nitrogen from a 130° C. oil bath through a 50-cm PTFE spinning band still to remove 750 mL dichloromethane. The oil bath temperature was then raised to 165° C. and the product was distilled. The input voltage to the column heater band was set at 20V on a Variac potentiostat.

Distillation fractions were analyzed by GC (30-m DB-5; 30° C./5 min, then 10° C./min; He: 14.8 cc/min). Retention times: 0.92 min (2,2-difluoroethanol; DFE); 1.06 (dichloromethane; DCM); 1.87 min (dimethyl carbonate; DMC; this is a byproduct in the methyl chloroformate); 4.75 min (2,2-difluoroethyl methyl carbonate, DFMC); 4.95 min (methyl isobutyl ketone; MIBK; this is an impurity in DFE).

| | | Spinning Band Distillation A | | | |
|---|---|---|---|---|---|
| Fraction | Reflux Ratio | BP (° C.) | Bath Temp, ° C. | Wt, g | GC Analysis (%) |
| 1A | 9 | 38.3-130.0 | 160 | 21 | 27.3 DCM; 17.7 DMC; 53.0 DFEA |
| 2A | 7 | 130.0-133.3 | 165 | 16 | 0.15 DCM; 1.53 DMC; 98.25 DFEA |
| 3A | 8 | 133.3 | 165 | 33 | 0.04 DCM; 0.09 DMC; 99.87 DFEA |
| 4A | 7 | 133.3-133.5 | 166 | 35 | 0.01 DCM; 0.07 DMC; 99.93 DFEA |
| 5A | 6 | 132.4-134.5 | 166 | 80 | 0.008 DCM; 99.98 DFEA; 0.016 MIBK |

The distilled yield of 2,2-difluorooethyl acetate (DFEA) was 175 g (82%); GC: 0.04% DCM, 0.17% DMC, 99.79% 2,2-difluorooethyl acetate. Fractions 2 A-5 A were combined (164 g) and redistilled with the column heater band set at 17V.

| | | Spinning Band Distillation B | | | |
|---|---|---|---|---|---|
| Fraction | Reflux Ratio | BP (° C.) | Bath Temp, ° C. | Wt, g | GC Analysis (%) |
| 1B | 7 | 109-130.0 | 167 | 3.4 | 6.46 DMC; 92.25 DFMC |
| 2B | 6 | 130.0-133.0 | 167 | 69 | 0.022 DCM; 0.023 DMC; 99.96 DFMC |

-continued

| Spinning Band Distillation B | | | | | |
|---|---|---|---|---|---|
| Fraction | Reflux Ratio | BP (° C.) | Bath Temp, ° C. | Wt, g | GC Analysis (%) |
| 3B | 6 | 133.0-133.3 | 167 | 58 | 99.99 DFMC |
| 4B | 6 | 133.3 | 167 | 28 | 100.00 DFMC |

Fraction 2B was redistilled, rejecting a forerun of 3.3 g (bp=128.3-132.9° C.). Then the product (63.7 g) was collected (bp=133.0-133.7° C.); GC: 0.01% DCM; 99.98% DFMC. This distillate was combined with fractions 3B and 4B to give 149 g of GC: 99.97% DFMC. This was spinning band-distilled once more in 3 fractions and was analyzed again by GC: Fraction 1 (82 g): 99.97; Fraction 2 (38 g): 99.98%; Fraction 3 (21 g): 99.97%. These fractions were recombined (140 g) and were used as battery electrolyte solvent.

Preparation of Electrolyte:

Lithium Bis(Oxalate)Borate (LiBOB) Purification

In a nitrogen purged dry box, lithium bis(oxalate)borate purification (LiBOB, Sigma-Aldrich, Milwaukee, Wis.) was purified by the following procedure. 11.25 g of LiBOB was added to a 400 ml beaker with 50 ml anhydrous acetonitrile. The mixture was stirred and heated to 40° C. for about 30 minutes. The warm mixture was filtered through a Whatman #1 filter and transferred into a second beaker and allow to cool to room temperature. A clear solution was obtained. To this clear solution, about 50 ml of cold anhydrous toluene (−30° C.) was added. This was stirred for an additional 30 minutes to form a precipitate. The solution was filtered through a Whatman #1 filter and the filter cake was washed again with the cold anhydrous toluene. After allowing the filter cake to dry on the vacuum filtration funnel, the solids were removed from the dry box and placed in a vacuum oven at 130° C. and dried with a slight nitrogen purge for 15 hours to form the final product, which was subsequently handled in the nitrogen purged drybox.

Formulation

The electrolyte formulation was prepared by combining 12.6298 grams of ethylene carbonate (BASF, Independence, Ohio), 5.908 grams of dimethyl carbonate, (BASF, Independence, Ohio), 11.8045 g of 2,2 difluoroethyl acetate and 11.7943 grams of 2,2 difluoroethyl methyl carbonate. The mixture was dried over 3 A molecular sieves until water content was below 1 ppm. The mixture was filtered using a 0.2 micron PTFE syringe filter and 5.422 grams of $LiPF_6$ (BASF, Independence, Ohio) was then added.

2.9547 g of the mixture described above was combined with 0.06 g of LiBOB to prepare the formulated electrolyte. The final formulation was 28 wt % DFEA/28 wt % DFMC/14 wt % DMC/30 wt % EC co-solvent, in 1M $LiPF_6$; 2 wt % LiBOB, 98 wt % formulation (98 wt % co-solvents and $LiPF_6$)

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Coin Cell Evaluations at 25° C.

The coin cells were cycled twice for formation using a commercial battery tester (Series 4000, Maccor, Tulsa, Okla.) at ambient temperature using constant current charging and discharging between voltage limits of 3.0-4.6 V at a current of 17.5 mA per gram of cathode active material, which is approximately a 0.1 C rate. Following this procedure, the coin cells were cycled using constant current charging and discharging between voltage limits of 3.0-4.6 V at a current of 87.5 mA per gram of cathode active material, which is approximately a C/2 rate. During each charge step, the voltage was subsequently held at 4.6 V until the current tapered to C/20 (approximately 8.75 mA per gram of active cathode material).

Capacity retention from coin cell cycling data:
Cell 1 at 290 cycles has retained 90.3%; cell 2 has retained 87.7% of its initial capacity Example 51

70 wt % DFEA/30 wt % EC Solvent Ratios/1 M $LiPF_6$ 2 wt % FEC, 2 wt % LiBOB, 96 wt % of colvents and $LiPF_6$ The same procedure as described in Example 50 was used.

The binder used was a Solef® 5130 (Solvay, Houston, Tex.) binder that was diluted to a 5.5% solution in NMP (N-methylpyrrolidone, Sigma Aldrich, St. Louis, Mo.). The following materials were used to make an electrode paste: 6.1592 g Farasis 1,1,1 NMC (NiCoMg, Farasis Energy, Hayward, Calif.) cathode active powder; 0.3524 g carbon black (Denka uncompressed, DENKA Corp., Japan); 6.2141 g PVDF (polyvinylidene difluoride) solution; and 2.061 g+0.5181 g NMP (Sigma Aldrich). The materials were combined in a ratio of 90:5:5, cathode active powder:PVDF:carbon black, as described below. The final paste contained 44.7 wt % solids.

The carbon black, the first portion of NMP, and the PVDF solution were first combined in a plastic THINKy container and centrifugally mixed (ARE-310, Thinky USA, Inc., Laguna Hills, Calif.) for 2 minutes at 2000 rpm. The cathode active powder and the $2^{nd}$ portion of NMP were added and the paste was centrifugally mixed once again at 2000 rpm for 2 minutes. The paste was then sonic horned for 3 seconds.

The paste was cast using doctor blades with a 6 mil gate height plus 2 mil of Kapton® tape onto high molecular weight Kapton® H primed aluminum foil (25 μm thick, 1145-0, Allfoils, Brooklyn Heights, Ohio) by hand. The electrodes were dried for 30 min at 90° C. in a vacuum oven. The resulting 51-mm wide cathodes were placed between 125 mm thick brass sheets and passed through a calendar three times using 100 mm diameter steel rolls at 125° C. with pressure increasing in each pass, at pressures of 18 psi, 24 psi, and 30 psi. The calendar is set to have a nip force (in lb)=37.8× regulator pressure (psi). The loading of the cathode active material was approximately 8.0-8.5 $mg/cm^2$.

Anode:

The same anode as described in Example 50 was used. The loadings of the anode active material was approximately 4.45-4.67 $mg/cm^2$.

Formulated Electrolyte:

The electrolyte was prepared by combining 70 weight % of 2,2-difluoroethyl acetate and 30 wt % ethylene carbonate (EC, BASF, Independence, Ohio) in a nitrogen purged drybox. Molecular sieves (3 A) were added and the mixture was dried to less than 1 ppm water. After filtration with a 0.2 micron PTFE syringe filter, LiPF$_6$ (lithium hexafluorophosphate, (BASF, Independence, Ohio) was added to make the formulated electrolyte at 1 M concentration.

1.925 g of this mixture was combined with 0.0400 g of purified LiBOB (described in Example ?) and 0.0410 g of fluoroethylene carbonate (BASF, Independence, Ohio). The final formulation was 70 wt % DFEA/30 wt % EC solvent ratios, add 1 M LiPF6, 2 wt % FEC, 2 wt % LiBOB, (96 wt % of co-solvents and LiPF6)

Capacity Retention from Coin Cell Cycling Data:

Cell 1 at 290 cycles has retained 90.6%; cell 2 has retained 80 of its initial capacity after 200 cycles

What is claimed is:

1. An electrolyte composition comprising:
    a) a fluorinated acyclic carboxylic acid ester represented by the formula:

$R^1$—COO—$R^2$, wherein $R^1$ and $R^2$ independently represent a linear or branched alkyl group; the sum of carbon atoms in $R^1$ and $R^2$ is 2 to 7; at least two hydrogens in $R^1$ and/or $R^2$ are replaced by fluorines; and neither $R^1$ nor $R^2$ contains a FCH$_2$ or FCH group;
    b) at least one co-solvent selected from the group consisting of ethylene carbonate, fluoroethylene carbonate, and propylene carbonate, and further comprising one or more members of the group consisting of ethyl methyl carbonate, dimethyl carbonate, diethyl carbonate, butylene carbonate, and ethyl methyl sulfone;
    c) at least one film-forming chemical compound which is present in the electrolyte composition at a concentration at which said film-forming chemical compound decomposes at a potential of less than +1.0 V versus a Li/Li$^+$ reference electrode, such that the electrolyte composition forms a film and wherein the electrolyte composition does not form a film at a potential of 1.0 V or above versus a Li/Li$^+$ reference electrode; and
    d) at least one electrolyte salt; with the proviso that b) and c) are different.

2. The electrolyte composition of claim 1, wherein the fluorinated solvent is a fluorinated acyclic carboxylic ester and the number of carbon atoms in $R^1$ is 1, 3, 4, or 5.

3. The electrolyte composition of claim 1, wherein the fluorinated solvent is a fluorinated acyclic carboxylic ester and the number of carbon atoms in $R^1$ is 1.

4. The electrolyte composition of claim 1, wherein the fluorinated solvent is a fluorinated acyclic carboxylic ester, $R^1$ does not contain fluorine, and $R^2$ contains fluorine.

5. The electrolyte composition of claim 1, wherein the fluorinated acyclic carboxylic acid ester is selected from one or more members of the group consisting of CH$_3$—COO—CH$_2$CF$_2$H, CH$_3$CH$_2$—COOCH$_2$CF$_2$H, F$_2$CHCH$_2$—COO—CH$_3$, F$_2$CHCH$_2$—COO—CH$_2$CH$_3$, CH$_3$—COO—CH$_2$CH$_2$CF$_2$H, CH$_3$CH$_2$—COO—CH$_2$CH$_2$CF$_2$H, F$_2$CHCH$_2$CH$_2$—COO—CH$_2$CH$_3$, and CH$_3$—COO—CH$_2$CF$_3$.

6. The electrolyte composition of claim 5, wherein the fluorinated acyclic carboxylic acid ester is 2,2-difluoroethyl acetate.

7. The electrolyte composition of claim 1, wherein the electrolyte composition further comprises a fluorinated acyclic carbonate selected from one or more members of the group consisting of CH$_3$—OC(O)O—CH$_2$CF$_2$H, CH$_3$—OC(O)O—CH$_2$CF$_3$, CH$_3$—OC(O)O—CH$_2$CF$_2$CF$_2$H, HCF$_2$CH$_2$—OCOO—CH$_2$CH$_3$, and CF$_3$CH$_2$—OCOO—CH$_2$CH$_3$.

8. The electrolyte composition of claim 1, wherein the electrolyte composition further comprises a fluorinated acyclic ether selected from one or more members of the group consisting of HCF$_2$CF$_2$CH$_2$—O—CF$_2$CF$_2$H and HCF$_2$CH$_2$—O—CF$_2$CF$_2$H.

9. The electrolyte composition of claim 1, wherein the at least one film-forming compound is present in an amount of about 0.01% to about 10% by weight of the total electrolyte composition.

10. The electrolyte composition of claim 1, wherein the electrolyte composition comprises 2,2-difluoroethyl acetate, ethylene carbonate and/or fluoroethylene carbonate, and maleic anhydride.

11. The electrolyte composition of claim 10, wherein the electrolyte composition comprises about 50% to about 80% of 2,2-difluoroethyl acetate by weight of the total electrolyte composition, about 10% to about 40% of ethylene carbonate, fluoroethylene carbonate, or a mixture thereof by weight of the total electrolyte composition; and about 0.25% to about 5.0% of maleic anhydride by weight of the total electrolyte composition.

12. The electrolyte composition of claim 10, wherein the electrolyte composition comprises about 50% to about 80% of 2,2-difluoroethyl acetate by weight of the total electrolyte composition, about 20% to about 30% of ethylene carbonate by weight of the total electrolyte composition, about 0.25% to about 5.0% of fluoroethylene carbonate by weight of the total electrolyte composition, and about 0.25% to about 5.0% of maleic anhydride by weight of the total electrolyte composition.

13. The electrolyte composition of claim 1, wherein the electrolyte composition comprises 2,2-difluoroethyl acetate and lithium bis(oxalate)borate, and one or more of ethylene carbonate, 2,2-difluoroethyl methyl carbonate, dimethyl carbonate, and fluoroethylene carbonate.

14. An electrochemical cell comprising:
    (a) a housing;
    (b) an anode and a cathode disposed in said housing and in ionically conductive contact with one another;
    (c) the electrolyte composition of claim 1 disposed in said housing and providing an ionically conductive pathway between said anode and said cathode; and
    (d) a porous separator between said anode and said cathode.

15. The electrochemical cell of claim 14, wherein said electrochemical cell is a lithium ion battery.

16. The lithium ion battery of claim 14, wherein the anode is lithium titanate or graphite.

17. The lithium ion battery of claim 14, wherein the cathode comprises a cathode active material exhibiting greater than 30 mAh/g capacity in the potential range greater than 4.6 V versus a Li/Li$^+$ reference electrode.

18. The lithium ion battery of claim 14, wherein the cathode comprises a cathode active material which is charged to a potential greater than or equal to 4.35 V versus a Li/Li$^+$ reference electrode.

19. The lithium ion battery of claim 14, wherein the cathode comprises a lithium-containing manganese composite oxide having a spinel structure as active material, the lithium-containing manganese composite oxide being represented by the formula:

$Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3.

20. The lithium ion battery of claim 14, wherein the cathode comprises $Li_aNi_bMn_cCo_dR_eO_{2-f}Z_f$, wherein:

R is Al, Ni, Co, Mn, Cr, Fe, Mg, Sr, V, Zr, Ti, a rare earth element, or a combination thereof, and Z is F, S, P, or a combination thereof; and $0.8 \leq a \leq 1.2$, $0.1 \leq b \leq 0.5$, $0.2 \leq c \leq 0.7$, $0.05 \leq d \leq 0.4$, $0 \leq e \leq 0.2$; wherein the sum of b+c+d+e is about 1; and $0 < f < 0.08$.

21. An electronic device, transportation device, telecommunications device, comprising an electrochemical cell according to claim 14.

22. A method comprising combining:

a) a fluorinated acyclic carboxylic acid ester represented by the formula:

$R^1$—COO—$R^2$, wherein $R^1$ and $R^2$ independently represent a linear or branched alkyl group; the sum of carbon atoms in $R^1$ and $R^2$ is 2 to 7; at least two hydrogens in $R^1$ and/or $R^2$ are replaced by fluorines; and neither $R^1$ nor $R^2$ contains a $FCH_2$ or FCH group;

b) at least one co-solvent selected from the group consisting of ethylene carbonate, fluoroethylene carbonate, and propylene carbonate, and further comprising one or more members of the group consisting of ethyl methyl carbonate, dimethyl carbonate, diethyl carbonate, butylene carbonate, and ethyl methyl sulfone;

c) at least one film-forming chemical compound which is present in the electrolyte composition at a concentration at which said film-forming chemical compound decomposes at a potential of less than +1.0 V versus a Li/Li$^+$ reference electrode, such that the electrolyte composition forms a film and wherein the electrolyte composition does not form a film at a potential of 1.0 V or above versus a Li/Li$^+$ reference electrode; and d) at least one electrolyte salt;

with the proviso that b) and c) are different;

to form an electrolyte composition.

23. The electrolyte composition of claim 1, wherein the electrolyte composition consists essentially of:

a) a fluorinated acyclic carboxylic acid ester represented by the formula:

$R^1$—COO—$R^2$, wherein $R^1$ and $R^2$, independently represent a linear or branched alkyl group; the sum of carbon atoms in any of $R^1$ and $R^2$ is 2 to 7; at least two hydrogens in $R^1$ and/or $R^2$ are replaced by fluorines; and neither $R^1$ nor $R^2$ contains a $FCH_2$ or FCH group;

b) at least one co-solvent selected from the group consisting of ethylene carbonate, fluoroethylene carbonate, and propylene carbonate, and further comprising one or more members of the group consisting of ethyl methyl carbonate, dimethyl carbonate, diethyl carbonate, butylene carbonate, and ethyl methyl sulfone;

c) at least one film-forming chemical compound which is present in the electrolyte composition at a concentration at which said film-forming chemical compound decomposes at a potential of less than +1.0 V versus a Li/Li$^+$ reference electrode, such that the electrolyte composition forms a film and wherein the electrolyte composition does not form a film at a potential of 1.0 V or above versus a Li/Li$^+$ reference electrode; and d) at least one electrolyte salt; with the proviso that b) and c) are different, wherein the at least one film-forming chemical compound is at least one selected from the group consisting of maleic anhydride, glutaric anhydride, 2,3-dimethylmaleic anhydride, citraconic anhydride, 1-cyclopentene-1,2-dicarboxylic anhydride, 2,3-diphenylmaleic anhydride, 3,4,5,6-tetrahydrophthalic anhydride, 2,3-dihydro-1,4-dithiono-[2,3-c]furan-5,7 dione, phenylmaleic anhydride.

24. An electrolyte composition comprising:

a) a fluorinated acyclic carboxylic acid ester represented by the formula:

$R^1$—COO—$R^2$, wherein $R^1$ and $R^2$ independently represent a linear or branched alkyl group; the sum of carbon atoms in $R^1$ and $R^2$ is 2 to 7; at least two hydrogens in $R^1$ and/or $R^2$ are replaced by fluorines; and neither $R^1$ nor $R^2$ contains a $FCH_2$ or FCH group;

b) at least one co-solvent selected from the group consisting of ethylene carbonate; fluoroethylene carbonate, and propylene carbonate, and further comprising one or more members of the group consisting of ethyl methyl carbonate, dimethyl carbonate, diethyl carbonate, butylene carbonate, and ethyl methyl sulfone;

c) at least one film-forming chemical compound which is not lithium bis(oxalate)borate and which is present in the electrolyte composition at a concentration at which said film-forming chemical compound decomposes at a potential of less than +1.0 V versus a Li/Li$^+$ reference electrode, such that the electrolyte composition forms a film and wherein the electrolyte composition does not form a film at a potential of 1.0 V or above versus a Li/Li$^+$ reference electrode; and d) at least one electrolyte salt; with the proviso that b) and c) are different.

* * * * *